(12) United States Patent
Shepherd et al.

(10) Patent No.: US 7,975,990 B1
(45) Date of Patent: Jul. 12, 2011

(54) MISTING ARRAY ASSEMBLY HAVING ADJUSTABLE NOZZLES

(75) Inventors: Donald W. Shepherd, Shelbyville, KY (US); Mark Ammons, New Albany, IN (US)

(73) Assignee: Caldwell Tanks, Inc., Louisville, KY (US)

( * ) Notice: Subject to any disclaimer, the term of this patent is extended or adjusted under 35 U.S.C. 154(b) by 0 days.

(21) Appl. No.: 12/787,372

(22) Filed: May 25, 2010

Related U.S. Application Data

(63) Continuation of application No. 12/787,243, filed on May 25, 2010.

(51) Int. Cl.
*B01F 3/04* (2006.01)

(52) U.S. Cl. .................. 261/78.2; 261/115; 261/117

(58) Field of Classification Search ............ 261/37, 261/78.2, 115, 116, 117, 118
See application file for complete search history.

(56) References Cited

U.S. PATENT DOCUMENTS

| | | | | |
|---|---|---|---|---|
| 2,802,543 A | * | 8/1957 | Clark | 96/232 |
| 3,419,251 A | | 12/1968 | Eckert | |
| 3,522,000 A | * | 7/1970 | Kinney | 423/243.06 |
| 4,211,735 A | * | 7/1980 | Berlin | 261/116 |
| 4,247,308 A | * | 1/1981 | Calvert et al. | 95/64 |
| 4,343,771 A | * | 8/1982 | Edwards et al. | 422/168 |
| D310,860 S | | 9/1990 | Delepine | |
| D311,053 S | | 10/1990 | Delepine | |
| D311,054 S | | 10/1990 | Delepine | |
| 4,980,099 A | * | 12/1990 | Myers et al. | 261/116 |
| 5,065,944 A | | 11/1991 | D'Amato | |
| D353,873 S | | 12/1994 | Schoeneman | |
| 5,387,376 A | * | 2/1995 | Gasser | 261/78.2 |
| 5,465,537 A | | 11/1995 | Fullwodd | |
| 5,523,028 A | * | 6/1996 | Reens et al. | 261/81 |
| 5,651,502 A | | 7/1997 | Edwards | |
| 5,867,977 A | | 2/1999 | Zachary et al. | |
| 5,930,990 A | | 8/1999 | Zachary et al. | |
| 6,007,604 A | | 12/1999 | Risse | |
| 6,051,055 A | | 4/2000 | Ukawa et al. | |
| 6,076,739 A | | 6/2000 | Littleford et al. | |
| 6,230,091 B1 | | 5/2001 | McQuinn | |

(Continued)

FOREIGN PATENT DOCUMENTS
WO 9847604 10/1998

OTHER PUBLICATIONS

Shepherd, Donald W.; Fraser, Donald; Impact of Heat Rate, Emissions and Reliability from the Application of Wet Compression on Combustion Turbines; 2005; pp. 1-6; US.

(Continued)

*Primary Examiner* — Scott Bushey
(74) *Attorney, Agent, or Firm* — Robert H. Eichenberger; Scott W. Higdon; Middleton Reutlinger

(57) ABSTRACT

Various methods and apparatus are disclosed that relate to one or more aspects of an abatement system that removes heat and/or one or more byproducts of combustion from a gas flow. In various aspects a misting array assembly is provided that includes at least one nozzle tubing having at least one nozzle coupled thereto.

21 Claims, 23 Drawing Sheets

U.S. PATENT DOCUMENTS

| | | | |
|---|---|---|---|
| 6,344,177 B1 | 2/2002 | Littleford | |
| 6,613,133 B2 * | 9/2003 | Piaskowski et al. | 96/322 |
| 6,719,829 B1 | 4/2004 | Schwab | |
| 6,857,268 B2 | 2/2005 | Stinger et al. | |
| D503,772 S | 4/2005 | Mody et al. | |
| 6,946,021 B2 * | 9/2005 | Aoyagi | 96/226 |
| 7,096,665 B2 | 8/2006 | Stinger et al. | |
| D588,711 S | 3/2009 | Ryba | |
| D616,110 S | 5/2010 | Rimsky | |
| 2009/0320440 A1 | 12/2009 | Erickson et al. | |

OTHER PUBLICATIONS

Jolly, Sanjeev; Wet Compression—A Powerful Means of Enhancing Combustion Turbine Capacity; Presented at Power-Gen International; Dec. 2002; pp. 1-12; Florida, US.

Gajjar, Hemant; Chaker, Mustapha; Dighe, Ajay; Meher-Homji, Cyrus B.; Proceedings of ASME Turbo Expo 2003; Inlet Fogging for a 655 MW Combined Cycle Power Plant-Design, Implementation and Operation Experience; Jun. 2003; pp. 1-9; Georgia, US.

\* cited by examiner

MISTING ARRAY ASSEMBLY HAVING ADJUSTABLE NOZZLES

CROSS-REFERENCE TO RELATED DOCUMENTS

This Application is a continuation of currently pending application Ser. No. 12/787,243 filed May 25, 2010 and entitled Removable Misting Array Assembly for an Abatement System, which is hereby incorporated by reference in its entirety. This application is related to the following co-pending Applications: application Ser. No. 12/787,374, filed May 25, 2010 and entitled System and Method for Repairing or Servicing a Misting Array Assembly of an Abatement System; Application Serial No. 12/787,373, filed May 25, 2010 and entitled Misting Array Assembly Having Upwardly and Downwardly Disposed Nozzles; application Ser. No. 29/362,440, filed May 25, 2010 and entitled Nozzle Tubing Having Offset Nozzles; Application Serial No. 29/362,443, filed May 25, 2010 and also entitled Nozzle Tubing Having Offset Nozzles; Application Serial No. 29/362,444, filed May 25, 2010 and entitled Misting Array Frame Structure; and Application Serial No. 29/362,442 filed May 25, 2010 and entitled Sealing Structure for Blocking an Opening.

TECHNICAL FIELD

The present invention is directed generally to aspects of an abatement system. More particularly, various inventive methods and apparatus disclosed herein relate to one or more aspects of an abatement system such as, for example, a pollution abatement system or a system which removes heat and/or one or more byproducts of combustion from a gas flow.

BACKGROUND

Abatement systems function, generally, to remove heat and/or one or more pollutants from a stream of flue gas that is created by the combustion of one or more fuels. For example, a heat abatement system may remove, and optionally recover, heat from a stream of flue gas that is created by the combustion of a hydrocarbon fuel. Also, for example, a pollution abatement system may remove one or more pollutants from a stream of flue gas that is created by the combustion of a hydrocarbon fuel. Byproducts of hydrocarbon fuel combustion include one or more of nitrogen, carbon dioxide, water, carbon monoxide, unburned hydrocarbons, oxides of sulfur, mercury, particulates (e.g., soot) and oxides of nitrogen. The carbon monoxide, unburned hydrocarbons, oxides of sulfur, mercury, particulates, and oxides of nitrogen are often classified as pollutants and may be subject to one or more governmental guidelines that regulate their control.

Many abatement systems make use of one or more misting arrays, optionally in combination with one or more condensing coils, to effect the removal of heat and/or at least one targeted pollutant. One such pollution abatement system is described in U.S. Pat. No. 6,344,177, which is hereby incorporated by reference in its entirety.

Generally speaking, the technology of U.S. Pat. No. 6,344,177 involves removing contaminants from flue gas by flowing the flue gas through a first misting array, a first condensing coil, a second misting array, and a second condensing coil. Other abatement systems may utilize different apparatus and methods for pollution abatement and/or heat recovery or abatement.

Although current abatement systems allow for the removal of heat and/or one or more pollutants from a contaminated gas flow, many suffer from one or more drawbacks. For example, abatement systems which employ one or more misting arrays may not obtain desired coverage characteristics from the misting array, may not employ misting arrays whose nozzle output is directionally adjustable, and/or may not employ misting arrays that may be conveniently serviced or replaced. Moreover, other aspects of the abatement system such as, for example, the intake and exhaust system, any condensing coil section present, and other structural aspects of and methods related to the abatement system, may suffer from one or more drawbacks. Thus, applicants have recognized and appreciated the need to improve various aspects of an abatement system.

SUMMARY

The present disclosure is directed to inventive methods and apparatus for aspects of an abatement system, and, more specifically, one or more aspects of an abatement system which removes heat and/or one or more byproducts of combustion from a contaminated gas flow. For example, some aspects of the present disclosure are directed to a misting array of an abatement system, some aspects are directed toward a condensing coil of an abatement system, some aspects are directed toward the intake and/or exhaust system of an abatement system, and other aspects are directed to other structural aspects of and methods related to an abatement system.

Generally, in one aspect, a misting array assembly disposed across an abatement chamber of an abatement system is provided. The abatement chamber has a gas flow extending therethrough moving in a gas flow direction and the misting array assembly includes a sealing piece, a frame structure, a first nozzle tubing, and a second nozzle tubing. The sealing piece has a first side and a second side opposite the first side. The frame structure is coupled to the sealing piece and provided on the second side of the sealing piece. The first nozzle tubing extends through the sealing piece and has a first nozzle tubing axis extending substantially perpendicular to the direction of the gas flow. The first nozzle tubing also has a first liquid source coupling and a plurality of first tubing nozzles. The first liquid source coupling is on the first side of the sealing piece and the first tubing nozzles are on the second side of the sealing piece. The second nozzle tubing extends through the sealing piece and has a second nozzle tubing axis extending substantially perpendicular to the direction of the gas flow. The second nozzle tubing also has a second liquid source coupling and a plurality of second tubing nozzles. The second liquid source coupling is on the first side of the sealing piece and the second tubing nozzles are on the second side of the sealing piece. The sealing piece, the frame structure, the first nozzle tubing, and the second nozzle tubing are movable between an inserted position and a removed position. In the inserted position the frame structure, the first nozzle tubing, and the second nozzle tubing are in the abatement chamber and in the removed position the frame structure, the first nozzle tubing, and the second nozzle tubing are removed from the abatement chamber.

In some embodiments the second nozzle tubing is positioned with respect to the first nozzle tubing in a direction that is substantially perpendicular to the direction of the gas flow.

In some embodiments at least a portion of the first nozzle tubing is fixedly adjustable about the first nozzle tubing axis to a first position and a second position, whereby adjusting the first nozzle tubing correspondingly adjusts the first tubing nozzles.

In some embodiments a plurality of the first tubing nozzles are provided at a first angular orientation relative to the first nozzle tubing axis and a plurality of the first tubing nozzles are provided at a second angular orientation relative to the first nozzle tubing axis. In some versions of these embodiments the first angular orientation is offset from the second angular orientation from ten to sixty degrees. In some versions of these embodiments the first angular orientation is offset from the second angular orientation from thirty to fifty degrees. In some versions of these embodiments the first angular orientation is offset from the second angular orientation approximately forty degrees.

In some embodiments the frame structure includes at least one member slidably engageable with corresponding track structure provided along at least a portion of the inner periphery of the abatement chamber.

In some embodiments a portion of the outer periphery of the frame structure generally conforms to a portion of the inner periphery of the abatement chamber.

Generally, in another aspect a misting array assembly disposed across an abatement chamber of an abatement system is provided. The abatement chamber has a gas flow extending therethrough and the misting array assembly includes a sealing piece, a frame structure, a first nozzle tubing, and a plurality of first tubing nozzles. The sealing piece has a first side and a second side opposite the first side. The frame structure is coupled to the sealing piece and provided on the second side of the sealing piece. At least a portion of the outer periphery of the frame structure engages structure within the abatement chamber. The first nozzle tubing is coupled to the frame structure and extends through the sealing piece. The first nozzle tubing has a liquid source coupling on the first side of the sealing piece. The first tubing nozzles produce a nozzle output having a nozzle output central axis. The first tubing nozzles are coupled to the first nozzle tubing on the second side of the sealing plate. The sealing piece, the frame structure, and the first nozzle tubing are slideably movable between an inserted position and a removed position. In the inserted position the frame structure, the first nozzle tubing, and the second nozzle tubing are in the abatement chamber and in the removed position the frame structure, the first nozzle tubing, and the second nozzle tubing are removed from the abatement chamber.

In some embodiments a plurality of the first tubing nozzles are upwardly disposed first tubing nozzles and a plurality of the first tubing nozzles are downwardly disposed first tubing nozzles. In some versions of these embodiments the nozzle output central axis of each of the upwardly disposed first tubing nozzles is at a ten to thirty degree upward angle with respect to the direction of the gas flow and the nozzle output central axis of each of the downwardly disposed first tubing nozzles is at a ten to thirty degree downward angle with respect to the direction of the gas flow.

In some embodiments at least a portion of the first nozzle tubing is fixedly rotationally adjustable from at least a first position to a second position, whereby adjusting the first nozzle tubing correspondingly adjusts the first tubing nozzles. In some versions of these embodiments the first nozzle tubing is linearly extending.

In some embodiments the frame structure includes at least one member slideably engageable with corresponding track structure provided along at least a portion of the inner periphery of the abatement chamber. In some versions of these embodiments the at least one member includes a side member opposite the sealing piece, an upper member extending between the sealing piece and the side member, and a lower member opposite the upper member and extending between the sealing piece and the side member.

In some embodiments the frame structure includes at least one track structure slidably engageable with a corresponding member provided along at least a portion of the inner periphery of the abatement chamber.

Generally, in another aspect, a misting array section of an abatement system is provided. The misting array section includes an abatement chamber misting section and a misting array assembly. The abatement chamber misting section has an opposed top and bottom extending between an opposed first side and second side. The top and the bottom each has track structure extending therefrom. The first side has an opening therethrough. The opening extends between the abatement chamber misting section and a shell of the abatement system and is in communication with the track structure of the top and the bottom. The abatement chamber misting section has a gas flow extending therethrough. A majority of the gas flow moves in a gas flow direction. The misting array assembly is removably received in the abatement chamber misting section and includes a sealing piece, a frame structure coupled to the sealing piece, nozzle tubing coupled to the frame structure, and at least one nozzle coupled to the nozzle tubing. The sealing piece has a sealing plate engageable against the shell of the abatement system. The frame structure includes an upper frame member and a lower frame member slideably receivable in respective track structure of the bottom and the top. The nozzle tubing extends through the sealing piece. The frame structure, the nozzle tubing, and the nozzle are slideably removable from and slideably insertable in the abatement chamber.

In some embodiments the misting array section further includes a side track structure extending from the second side and the frame structure further includes a side frame member extending between the upper frame member and the lower frame member and being slideably receivable in the side track structure.

In some embodiments the misting array section further includes a gasket interposed between the sealing plate and the shell of the abatement system.

In some embodiments a plurality of the nozzle are provided, at least some thereof being upwardly disposed tubing nozzles. The nozzle output central axis of each of the upwardly disposed tubing nozzles may be at a five to thirty degree upward angle counter to the direction of the gas flow.

In some embodiments some of the plurality of the nozzle are downwardly disposed tubing nozzles. The nozzle output central axis of each of the downwardly disposed tubing nozzles may be at a five to thirty degree downward angle with the direction of the gas flow.

Generally, in another aspect, a misting array assembly disposed across an abatement chamber of an abatement system is provided. The abatement chamber has a gas flow extending therethrough and the misting array assembly includes a first nozzle tubing. The first nozzle tubing has first tubing nozzles each producing a nozzle output having a nozzle output central axis. A plurality of the first tubing nozzles are upwardly disposed first tubing nozzles and a plurality of the first tubing nozzles are downwardly disposed first tubing nozzles. The nozzle output central axis of each of the upwardly disposed first tubing nozzles is at a five to forty degree upward angle with respect to the direction of the gas flow. The nozzle output central axis of each of the downwardly disposed first tubing nozzles is at a five to forty degree downward angle with respect to the direction of the gas flow. At least one of the upwardly disposed first tubing nozzles is immediately neighbored on each side by at least one of the downwardly disposed first tubing nozzles.

In some embodiments the upwardly disposed first tubing nozzles and the downwardly disposed first tubing nozzles are alternatingly provided on the first nozzle tubing.

In some embodiments the misting array assembly further includes a second nozzle tubing having second tubing nozzles each producing a nozzle output having a nozzle output central axis, the second nozzle tubing being positioned with respect to the first nozzle tubing in a direction that is perpendicular to the direction of the gas flow. In some versions of these embodiments a plurality of the second tubing nozzles are upwardly disposed second tubing nozzles and a plurality of the second tubing nozzles are downwardly disposed second tubing nozzles. The nozzle output central axis of each of the upwardly disposed second tubing nozzles may be at a five to forty degree upward angle with respect to the direction of the gas flow and the nozzle output central axis of each of the downwardly disposed second tubing nozzles may be at a five to forty degree downward angle with respect to the direction of the gas flow. In some versions of these embodiments the nozzle output central axis of each of the upwardly disposed second tubing nozzles may be at a fifteen to twenty-five degree upward angle with respect to the direction of the gas flow and the nozzle output central axis of each of the downwardly disposed second tubing nozzles may be at a fifteen to twenty-five degree downward angle with respect to the direction of the gas flow. In some versions of these embodiments the misting array assembly further includes a non-offset nozzle tubing between the first nozzle tubing and the second nozzle tubing. The non-offset nozzle tubing has a plurality of non-offset nozzles each producing a nozzle output having a nozzle output central axis at a zero to five degree angle with respect to the direction of the gas flow. In some versions of these embodiments an output capacity of the non-offset nozzle tubing is at least one-third less than an output capacity of the first nozzle tubing and less than an output capacity of the second nozzle tubing. In some versions of these embodiments the upwardly disposed second tubing nozzles and the downwardly disposed second tubing nozzles are alternatingly provided on the second nozzle tubing.

In some embodiments the nozzle output central axis of each of the upwardly disposed first tubing nozzles is directed counter to the direction of the gas flow. In some versions of these embodiments the nozzle output central axis of each of the downwardly disposed first tubing nozzles is directed counter to the direction of the gas flow.

Generally, in another aspect, a misting array assembly disposed across an abatement chamber of an abatement system is provided. The abatement chamber has a gas flow extending therethrough and the misting array assembly includes an adjustable first nozzle tubing, a plurality of first tubing nozzles coupled to the first nozzle tubing, an adjustable second nozzle tubing, and a plurality of second tubing nozzles coupled to the second nozzle tubing. The adjustable first nozzle tubing has a first nozzle tubing axis extending substantially perpendicular to the direction of the gas flow. The first tubing nozzles each produce a nozzle output having a nozzle output central axis. At least one of the first tubing nozzles is disposed at a first angular orientation and at least one of the first tubing nozzles is disposed at a second angular orientation. The first angular orientation is offset from the second angular orientation from five to sixty degrees. The first nozzle tubing is fixedly adjustable about the first nozzle tubing axis from at least a first position to a second position, whereby adjusting the first nozzle tubing correspondingly adjusts the first tubing nozzles. The second nozzle tubing has a second nozzle tubing axis extending substantially perpendicular to the direction of the gas flow. At least a portion of the second nozzle tubing is fixedly adjustable about the second nozzle tubing axis to a plurality of positions, whereby adjusting the second nozzle tubing correspondingly adjusts the second tubing nozzles.

In some embodiments a plurality of alternating first tubing nozzles are provided at the first angular orientation. In some versions of these embodiments the first angular orientation is offset from the second angular orientation ten to fifty degrees.

In some embodiments each of the second tubing nozzles is provided at a common angular orientation relative to the second nozzle tubing axis.

In some embodiments the first position and the second position are offset from one another at least five degrees about the first nozzle tubing axis. In some versions of these embodiments the first nozzle tubing is fixedly adjustable about the first nozzle tubing axis to a plurality of positions between the first position and the second position.

In some embodiments the misting array assembly further includes an indicator coupled to the first nozzle tubing and located exteriorly of the abatement chamber.

In some embodiments a majority of the nozzle output of each of the nozzles is directed with the direction of the gas flow.

In some embodiments the first nozzle tubing is adjustable exteriorly of the abatement chamber.

Generally, in another aspect a misting array assembly disposed across an abatement chamber of an abatement system is provided. The abatement chamber has a gas flow extending therethrough and the misting array assembly includes a sealing piece, a frame structure, a first nozzle tubing, and a plurality of first tubing nozzles. The sealing piece has a first side and a second side opposite the first side. The frame structure is coupled to the sealing piece and provided on the second side of the sealing piece. The first nozzle tubing is coupled to the frame structure and extends through the sealing piece. The first nozzle tubing also has a liquid source coupling on the first side of the sealing piece. The first tubing nozzles produce a nozzle output having a nozzle output central axis and are coupled to a nozzle section of the first nozzle tubing on the second side of the sealing piece. A plurality of the first tubing nozzles are upwardly disposed first tubing nozzles and a plurality of the first tubing nozzles are downwardly disposed first tubing nozzles. The nozzle output central axis of each of the upwardly disposed first tubing nozzles is at a five to forty-five degree upward angle with respect to the direction of the gas flow and the nozzle output central axis of each of the downwardly disposed first tubing nozzles is at a five to forty-five degree downward angle with respect to the direction of the gas flow.

In some embodiments the nozzle section of the first nozzle tubing is linearly extending.

In some embodiments the upwardly disposed first tubing nozzles and the downwardly disposed first tubing nozzles are alternatingly provided on the first nozzle tubing.

Generally, in another aspect an abatement system is provided. The abatement system includes a gas flow inlet, an abatement chamber, a gas flow outlet, and a misting array assembly. The abatement chamber is downstream of the gas flow inlet and includes an abatement chamber misting section having an opening therethrough. The opening extends between the abatement chamber misting section and a shell of the abatement system. The abatement chamber gas flow outlet is downstream of the abatement chamber misting section. The abatement chamber has a gas flow extending from the gas flow inlet to the gas flow outlet. The misting array assembly is received in the abatement chamber misting section. The misting array assembly includes a sealing piece blocking the opening, a frame structure coupled to the sealing piece and extending into the abatement chamber misting section, a nozzle tubing coupled to the frame structure, and at least one nozzle coupled to the nozzle tubing. The nozzle tubing extends into the abatement chamber. At least a portion of the nozzle tubing is fixedly rotationally adjustable from exteriorly of the abatement system to a plurality of positions, whereby adjusting the nozzle tubing correspondingly adjusts the at least one nozzle.

In some embodiments the nozzle tubing is rotationally adjustable to a plurality of fixed preselected positions.

In some embodiments the nozzle tubing is linearly extending.

In some embodiments the nozzle tubing is rotationally adjustable between at least a first position and a second potion that are rotationally offset at least ten degrees from one another.

In some embodiments a plurality of the nozzle are coupled to the nozzle tubing. In some versions of these embodiments some of the plurality of the nozzle are upwardly extending and some of the nozzle are downwardly extending.

In some embodiments the sealing piece includes a sealing plate. In some versions of these embodiments the sealing piece further includes a sealing piece extension extending from the sealing plate into the opening.

In some embodiments the nozzle tubing extends through the sealing piece.

Generally, in another aspect a misting array assembly disposed across an abatement chamber of an abatement system is provided. The abatement chamber has a gas flow extending therethrough and the misting array assembly includes a sealing piece, a frame structure, a first nozzle tubing, a plurality of first tubing nozzles, a second nozzle tubing, and a plurality of second tubing nozzles. The sealing piece has a first side and a second side opposite the first side. The frame structure is coupled to the sealing piece and provided on the second side of the sealing piece. At least a portion of the outer periphery of the frame structure engages structure within the abatement chamber. The first nozzle tubing is coupled to the frame structure and extends through the sealing piece. The first nozzle tubing has a liquid source coupling on the first side of the sealing piece and a nozzle section on the second side of the sealing piece. The first tubing nozzles are coupled to the first nozzle tubing. The second nozzle tubing is coupled to the frame structure and extends through the sealing piece. The second nozzle tubing has a second liquid source coupling on the first side of the sealing piece and a second nozzle section on the second side of the sealing piece. The second tubing nozzles are coupled to the second nozzle tubing. The first nozzle section is independently fixedly rotationally adjustable to a plurality of first nozzle section positions, whereby adjusting the first nozzle section correspondingly adjusts the first tubing nozzles. The second nozzle section is independently fixedly rotationally adjustable from to a plurality of second nozzle section positions, whereby adjusting the second nozzle section correspondingly adjusts the second tubing nozzles.

In some embodiments a plurality of the first tubing nozzles are upwardly disposed first tubing nozzles and a plurality of the first tubing nozzles are downwardly disposed first tubing nozzles. In some versions of these embodiments the first nozzle section is linearly extending. In some versions of these embodiments an upward nozzle output central axis of each of the upwardly disposed first tubing nozzles is at a ten to thirty degree upward angle with respect to the direction of the gas flow and a downward nozzle output central axis of each of the downwardly disposed first tubing nozzles is at a ten to thirty degree downward angle with respect to the direction of the gas flow.

In some embodiments the first nozzle section and second nozzle section are each independently rotationally adjustable to a plurality of fixed preselected positions.

In some embodiments the first nozzle tubing and the second nozzle tubing are fixedly rotationally adjustable from a location on the first side of the sealing piece.

In some embodiments the first nozzle tubing includes an indicator on the first side of the sealing piece. In some versions of these embodiments the first side of the sealing piece includes a plurality of fiducial markings proximal the indicator.

Generally, in another aspect a misting array assembly disposed across an abatement chamber of an abatement system is provided. The abatement chamber has a gas flow extending therethrough and the misting array assembly includes a sealing piece, a frame structure, a first nozzle tubing, and a second nozzle tubing. The sealing piece has a first side and a second side opposite the first side. The frame structure is coupled to the sealing piece and provided on the second side of the sealing piece. The first nozzle tubing is coupled to the frame structure and extends through the sealing piece. The first nozzle tubing has a first nozzle tubing axis extending substantially perpendicular to the direction of the gas flow. The first nozzle tubing also has a liquid source coupling and a plurality of first tubing nozzles. The first liquid source coupling is on the first side of the sealing piece and the first tubing nozzles are on the second side of the sealing piece. The second nozzle tubing is coupled to the frame structure and extends through the sealing piece. The second nozzle tubing has a second nozzle tubing axis extending substantially perpendicular to the direction of the gas flow. The second nozzle tubing also has a liquid source coupling and a plurality of second tubing nozzles. The second liquid source coupling is on the first side of the sealing piece and the second tubing nozzles are on the second side of the sealing piece. At least a portion of the first nozzle tubing and a portion of the second nozzle tubing are each independently fixedly rotationally adjustable to a plurality of positions.

In some embodiments the second nozzle tubing is positioned with respect to the first nozzle tubing in a direction that is substantially perpendicular to the direction of the gas flow.

In some embodiments the first nozzle tubing includes a pipe nipple extending through the sealing piece. In some versions of these embodiments the first nozzle tubing includes an adjustable coupling on an interior side of the sealing plate.

Generally, in another aspect an abatement system having at least one removable misting array assembly is provided. The abatement system includes an abatement chamber, a first misting array assembly, a first condensing coil, a second misting array assembly, a second condensing coil, and a temporary replacement piece. The first misting array assembly is disposed in the abatement chamber. The first misting array assembly extends through a first misting array opening in the abatement chamber. The first misting array assembly includes a first sealing piece sealingly engaging the first misting array opening, a first frame structure coupled to the first sealing piece and disposed in the abatement chamber, and a first nozzle tubing having at least one first nozzle coupled thereto. The first nozzle tubing is coupled to the first sealing piece and the first frame structure and disposed in the abatement chamber. The first condensing coil is disposed in the abatement chamber downstream from the first misting array assembly. The second misting array assembly is disposed in the abatement chamber downstream from the first condensing coil. The second misting array assembly extends through a second misting array opening in the abatement chamber. The second misting array includes a second sealing piece sealingly engaging the second misting array opening, a second frame structure coupled to the second sealing piece and disposed in the abatement chamber, and a second nozzle tubing having at least one second nozzle coupled thereto. The second nozzle tubing is coupled to the second sealing piece and the second frame structure and disposed in the abatement chamber. The second condensing coil is disposed in the abatement chamber downstream from the second misting array assembly. At least one of the first misting array assembly and the second misting array assembly is slidably and integrally removable from the abatement chamber, thereby exposing a respective one of the first opening and the second opening. The temporary replacement piece is sealingly engageble with at least one of the first opening and the second opening when a respective of the first misting array and the second misting array is removed from the abatement chamber.

In some embodiments the first misting array sealing piece includes a sealing plate engageable over an exterior portion of the first opening. In some versions of these embodiments the temporary replacement piece is sealingly engageable with the first opening and includes a temporary sealing plate engageable over an exterior portion of the first opening. In some versions of these embodiments the first misting array sealing piece further includes a sealing piece extension extending from the sealing plate. The sealing piece extension is removably receivable within the first opening and optionally in substantially conforming fit with the first opening. In some versions of these embodiments the temporary replacement piece further includes a sealing piece extension extending from the sealing plate. The sealing piece extension is removably receivable within the first opening and optionally in substantially conforming fit with the first opening.

In some embodiments both the first misting array assembly and the second misting array assembly are removable from the abatement chamber.

In some versions of these embodiments the temporary replacement piece is sealingly engageable with both the first opening and the second opening when a respective of the first misting array and the second misting array is removed from the abatement chamber. In some versions of these embodiments at least one of the first condensing coil and the second condensing coil is slideably removable from the abatement chamber.

In some embodiments the abatement system further includes a third misting array assembly disposed in the abatement chamber downstream from the first misting array assembly.

In some versions of these embodiments the abatement system further includes a third condensing coil disposed in the abatement chamber downstream from the third misting array assembly. The third misting array assembly is optionally disposed in the abatement chamber downstream from the second condensing coil.

In some embodiments the temporary replacement piece is coupled to the first frame structure and engages the first opening when the first misting array is removed from the abatement chamber.

Generally, in another aspect an abatement system having at least one removable misting array assembly is provided. The abatement system includes an abatement chamber, a first misting array assembly, a first condensing coil, and a temporary replacement piece. The first misting array assembly is disposed in the abatement chamber and extends through a first misting array opening in the abatement chamber. The first misting array assembly includes a first sealing piece sealingly engaging the first misting array opening, a first frame structure disposed in the abatement chamber, and a first nozzle tubing having at least one first nozzle coupled thereto. The first nozzle is disposed in the abatement chamber. The first temporary replacement piece is coupled to the first frame structure interiorly of the abatement chamber and is sealingly engageable with the first opening. A first condensing coil is disposed in the abatement chamber downstream from the first misting array assembly. The first misting array assembly is at least partially removable from the abatement chamber. When the first misting array assembly is at least partially removed from the abatement chamber the first temporary replacement piece engages the first opening.

In some embodiments the first misting array sealing piece includes a sealing plate engageable over an exterior portion of the first opening.

In some embodiments the first temporary replacement piece includes a temporary sealing plate engageable over the first opening.

In some embodiments the abatement system further includes a second misting array assembly disposed in the abatement chamber.

Generally, in another aspect, a method of servicing or replacing a misting array assembly of an abatement system while minimizing any interruption to the abatement system is provided. The method includes the steps of: removing a first misting array assembly from an abatement chamber of the abatement system, thereby creating an opening between the abatement chamber and an exterior environment surrounding the abatement chamber; covering the opening with a temporary replacement piece; wherein the temporary replacement piece seals the opening; and maintaining a second misting array assembly within the abatement chamber and operating at least the second misting array assembly and a fan of the abatement system during at least some of the time the opening is covered with the temporary replacement piece.

In some embodiments the method further includes the step of uncovering the opening by removing the temporary replacement piece and placing either the first misting array assembly or a replacement misting array assembly into the abatement chamber via the opening.

In some embodiments at least the second misting array assembly and the fan of the abatement system are operated during the entire time the opening is covered with the temporary replacement piece.

In some embodiments at least the second misting array assembly and the fan of the abatement system are operated during the entire time the first misting array is removed from the abatement chamber.

In some embodiments the temporary replacement piece is coupled to the first misting array interiorly of the abatement chamber.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

When reference is made herein to all or a portion of nozzle output being directed "counter" to the direction of a gas flow, it is intended only that the cited portion of nozzle output have a component of its velocity that is directed counter to the gas flow. For example, if the gas flow is moving in a first direction along a first axis, it is intended that nozzle output moving "counter" thereto have a component of its velocity that is directed in a second direction (opposite the first direction) along the first axis. Accordingly, a portion of nozzle output that has a velocity component only in the second direction along the first axis would be directed counter to the gas flow. Likewise, a portion of nozzle output that has a velocity component in the second direction along the first axis and also has a velocity component along a second axis that is perpendicular the first axis would also be directed counter to the gas flow.

Similarly, when reference is made herein to all or a portion of nozzle output being directed "with" the direction of a gas flow, it is intended only that the cited portion of nozzle output have a component of its velocity that is directed with the gas flow. For example, if the gas glow is moving in a first direction along a first axis, it is intended that nozzle output moving "with" the gas flow have a component of its velocity that is directed in the first direction along the first axis.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
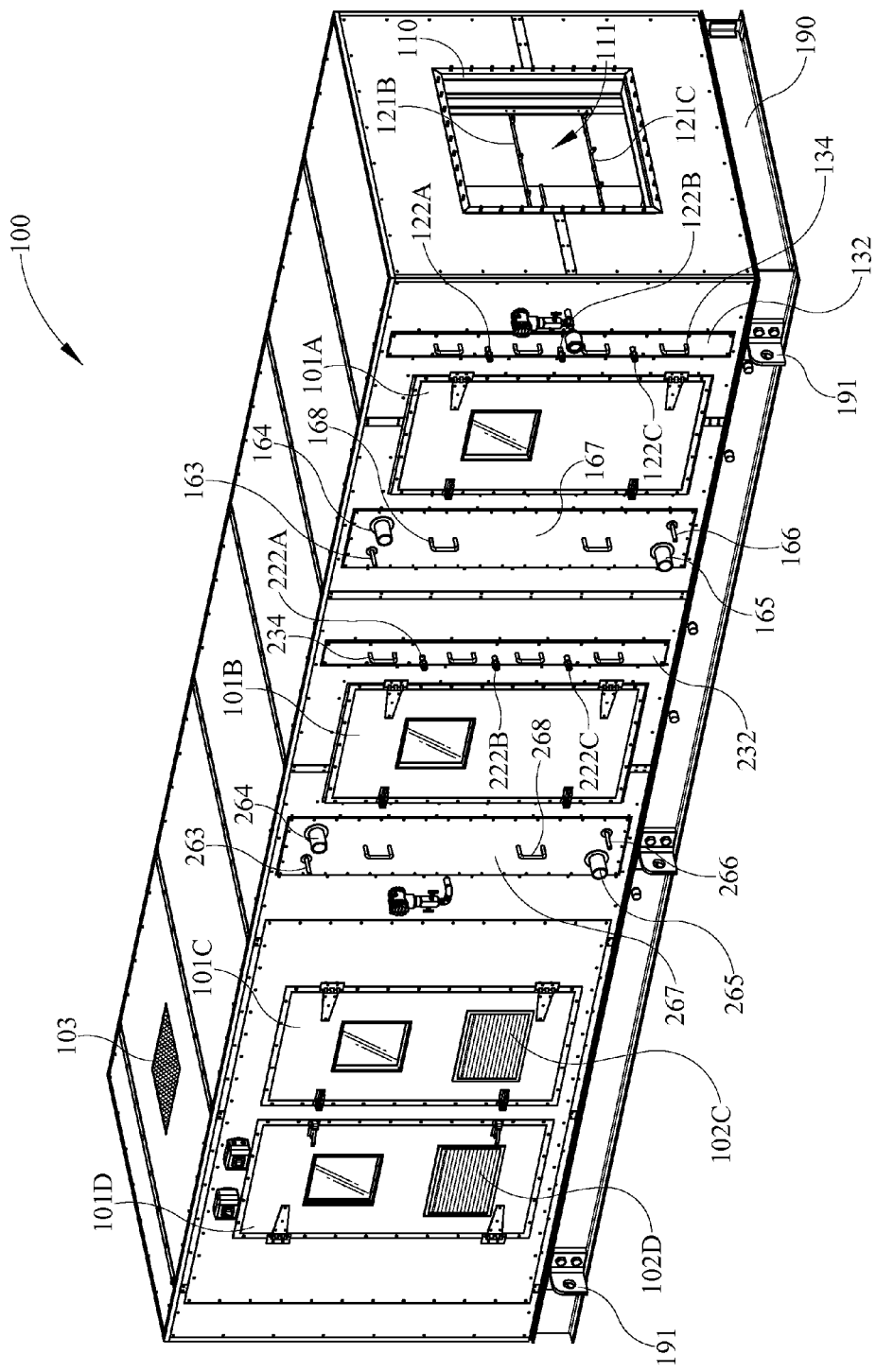
FIG. 1 illustrates an upper access side and intake side perspective view of a first embodiment of an abatement system.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the claimed invention. For example, the aspects of an abatement system disclosed herein are described in conjunction with an abatement system having a first misting array disposed in an abatement chamber, a first condensing coil downstream from the first misting array, a second misting array downstream from the first condensing coil, and a second condensing coil downstream from the second misting array. However, one or more aspects of an abatement system described herein may be implemented in abatement systems having other configurations and implementation of the one or more aspects described herein in alternatively configured abatement systems is contemplated without deviating from the scope or spirit of the claimed invention. Also, for example, many aspects of an abatement system disclosed herein are described in conjunction with an abatement system that abates both heat and pollution from a gas stream. However, such aspects of an abatement system described herein may be implemented in abatement systems that abate only heat or abate only pollution or any other desired component.

In FIG. 1 through FIG. 15 various aspects of a first embodiment of an abatement system 100 are shown. Referring initially to FIG. 1 through FIG. 4, it is illustrated that the abatement system 100 includes a support base 190 supporting a structure having a generally longitudinally extending and generally rectangular shape. The support base 190 includes a plurality of lifting lugs 191 around the periphery thereof that may be utilized in lifting and placing the abatement system 100 in a desired installation spot. The lifting lugs 191 may optionally be removed once the abatement system 100 is placed in a desired location.

The abatement system 100 also includes an air inlet opening 110 that defines an air inlet 111. The air inlet 111 generally defines the beginning of an abatement chamber that extends interiorly through a portion of abatement system 100 and that will be described in additional detail herein. Air inlet 111 may be placed in communication with a polluted gas stream such as, for example, a flue gas stream containing at least one pollutant. For example, in some embodiments duct work may be sealingly coupled to air inlet opening 110 and may carry a polluted gas stream from a location remote from the abatement system 100 to the air inlet 111. The depicted abatement system 100 may, in some embodiments, be utilized to remove pollutants from a flue gas stream created by the combustion of natural gas.

An upper nozzle section 121A of an upper nozzle tubing, a middle nozzle section 121B of a middle nozzle tubing, and a lower nozzle section 121C of a lower nozzle tubing are provided adjacent the air inlet 111. The upper, middle, and lower nozzle section 121A, 121B, and 121C form part of a first misting array 120, are provided in a downstream direction from the air inlet 111, and are disposed in a first misting section of the abatement chamber. The upper, middle, and lower nozzle tubing include, respectively, liquid source couplings 122A, 122B, and 122C, which are provided exteriorly of the abatement system 100. The liquid source couplings 122A, 122B, and 122C may be coupled to tubing that is in communication with a water source, a water based solution source, or other liquid source. In some embodiments the liquid source couplings 122A, 122B, and 122C may be half inch female tube fittings. In some embodiments the liquid source couplings 122A, 122B, and 122C may be coupled to tubing that is in communication with a liquid source comprising water and/or hydrogen peroxide. In some embodiments the first misting array 120 may increase the relative humidity of gas flow moving through the first misting section to sixty to approximately one hundred percent relative humidity.

Referring now to FIG. 5 through FIG. 10, various aspects of the first misting array 120 are illustrated and will be described in additional detail. The first misting array 120 includes a sealing piece 130 having a sealing plate 132. The sealing piece 130 also optionally includes a first sealing piece extension 135 extending rearwardly from the sealing plate 132. Vertically aligned handles 134 are coupled to the sealing piece 130 and extend from a front face thereof. As will be described in additional detail herein, the handles 134 may aid in the removal of the first misting array 120 from the abatement chamber.

A frame structure is coupled to the first sealing piece 130 and includes an upper frame structure member 141 having an upper frame structure rim portion 142 (shown in FIG. 6), a side frame structure member 145 having a side frame structure rim portion 146, and a lower frame structure member 143 having a lower frame structure rim portion 144. A middle support bar 148 of the frame structure extends vertically between the upper frame structure rim portion 142 and the lower frame structure rim portion 144. A side support bar 147 of the frame structure extends from the side frame structure rim portion 146 inwardly toward the middle support bar 148. The depicted frame structure is geometrically similar to the interior of the misting section of the abatement chamber. Also, as will be described herein in conjunction with a second misting array 220, the upper frame structure member 141, the lower frame structure member 143, and the side frame structure member 145 are configured to slidingly engage a corresponding track extending from portions of the abatement chamber when the misting array 120 is installed.

The upper nozzle section 121A of the upper nozzle tubing is coupled to the sealing piece 130, is coupled to the middle support bar 148 via U clamp 149A (FIG. 6), and is coupled to the side support bar 147 by a U clamp (not shown). The upper nozzle section 121A also extends through an aperture provided through the side frame structure rim portion 146. The upper nozzle section 121A is coupled to the sealing piece 130 via a female tube fitting 124A that is coupled to a pipe nipple 123A on an abatement chamber side of the sealing piece 130. The pipe nipple 123A extends through and is coupled to the sealing piece extension 135 and the sealing plate 132 of the sealing piece 130. The pipe nipple 123A is also coupled to the liquid source coupling 122A provided on an exterior side of the sealing piece 130. A plug is provided at the end of upper nozzle section 121A distal its coupling with female tube fitting 124A.

In a similar manner as the upper nozzle section 121A, the middle nozzle section 121B is coupled to the middle support bar 148 via a U clamp 149B (FIG. 6), is coupled to the side support bar 147 by a U clamp (not shown), and extends through an aperture provided through the side frame structure rim portion 146. The middle nozzle section 121B is coupled to the sealing piece 130 via a female tube fitting 124B that is coupled to a pipe nipple 123B on an abatement chamber side of the sealing piece 130. The pipe nipple 123B extends through and is coupled to the sealing piece extension 135 and the sealing plate 132 of the sealing piece 130. The pipe nipple 123B is also coupled to the liquid source coupling 122B provided on an exterior side of the sealing piece 130. A plug is provided at the end of middle nozzle section 121B distal its coupling with female tube fitting 124B.

In a similar manner as the upper nozzle section 121A and the middle nozzle section 121C, the lower nozzle section 121C is coupled to the middle support bar 148 via a U clamp 149C (FIG. 6), is coupled to the side support bar 147 by a U clamp (not shown), and extends through an aperture provided through the side frame structure rim portion 146. The middle nozzle section 121C is coupled to the sealing piece 130 via a female tube fitting 124C that is coupled to a pipe nipple 123C on an abetment chamber side of the sealing piece 130. The pipe nipple 123C extends through and is coupled to the sealing piece extension 135 and the sealing plate 132 of the sealing piece 130. The pipe nipple 123C is also coupled to the liquid source coupling 122C provided on an exterior side of the sealing piece 130. A plug is provided at the end of the lower nozzle section 121C distal its coupling with female tube fitting 124C. The use of caulking, gaskets, and/or welding may optionally be utilized at the juncture between the pipe nipples 123A, 123B, 123C, and the openings through sealing piece 135 and/or the openings through sealing plate 132 in order to ensure a satisfactory seal and/or to prevent rotational movement of the of the pipe nipples 123A, 123B, and 123C.

The upper nozzle section 121A includes six upwardly disposed upper tubing nozzles 126A and six downwardly disposed upper tubing nozzles 128A. The upwardly disposed upper tubing nozzles 126A and the downwardly disposed upper tubing nozzles 128A are alternately provided on the upper nozzle section 121A. Each of the upwardly disposed upper tubing nozzles 126A and each of the downwardly disposed upper tubing nozzles 128A is in flow communication with a liquid pathway extending through the interior of upper nozzle section 121A, female tube fitting 124A, pipe nipple 123A, and liquid source coupling 122A. Optionally, each of the upwardly disposed upper tubing nozzles 126A and each of the downwardly disposed upper tubing nozzles 128A may be coupled to the liquid pathway within upper nozzle tubing 121A using a full penetration weld.

Each of the upwardly disposed upper tubing nozzles 126A and each of the downwardly disposed upper tubing nozzles 128A has a nozzle output central axis that is directed counter to the direction of gas flow through the abatement chamber when the first misting array 120 is installed therein. In alternative embodiments one or more of the upwardly disposed upper tubing nozzles 126A and/or one or more of the downwardly disposed upper tubing nozzles 128A may be positioned such that the nozzle output central axis thereof is directed with the direction of the gas flow. The nozzle output central axis is an axis that generally corresponds to the center of the nozzle output. For example, if the nozzle output was generally conical, the nozzle output central axis would extend centrally from the tip of the cone to the center of the base of the cone. In the depicted embodiment, the nozzle output central axis of each upwardly disposed upper tubing nozzle 126A is at approximately a forty degree angle with respect to a central output axis of each of the downwardly disposed upper tubing nozzles 128A.

When the female tube fitting 124A is sufficiently tightened, it compresses against upper nozzle section 121A and thereby causes upper nozzle section 121A to be fixed at a given rotational orientation. Accordingly, the rotational orientation of the upper nozzle section 121A may be fixed at a desired rotational orientation when tightening female tube fitting 124A. Moreover, the female tube fitting 124A may be subsequently loosened, the rotational orientation of the upper nozzle tubing adjusted, and the female tube fitting 124A retightened to thereby readjust the rotational orientation of the upper nozzle section 121A. Adjusting the rotational orientation of the fist nozzle section 121A also correspondingly adjusts the orientation of the upwardly disposed upper tubing nozzles 126A and the downwardly disposed upper tubing nozzles 128A with respect to the gas flow moving through the abatement chamber. Adjusting the rotational orientation of the upper nozzle section 121A may allow for tuning of the misting output emitted from the nozzles 126A and 128A thereof in order to produce desired misting quantity and/or saturation in one or more parts of the misting section of the abatement chamber. Also, the female tube fitting 124A may be loosened and upper nozzle section 121A removed to allow for cleaning and/or replacement of upper nozzle section 121A and/or nozzles 126A and 128A thereof.

Figure 8A:
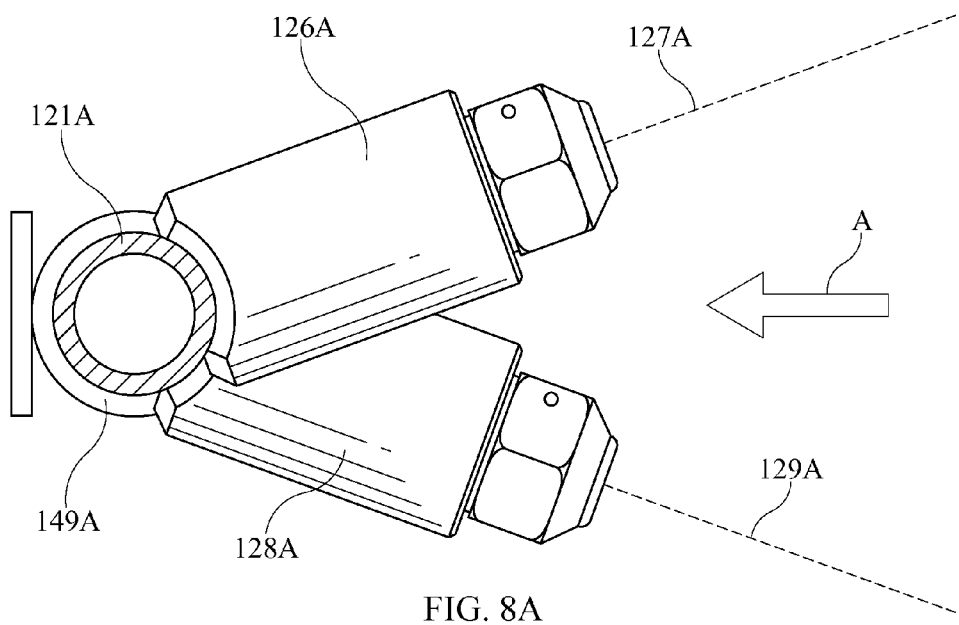
FIG. 8A illustrates a section view taken along the section line 8A-8A of FIG. 5 showing an upper nozzle tubing fixedly rotationally adjusted to a first position.

Referring to FIG. 8A, the upper nozzle section 121A is illustrated adjusted to a first rotational orientation. A central output axis 127A of the visible upwardly disposed upper tubing nozzle 126A is at approximately a forty degree angle with respect to a central output axis 129A of the visible downwardly disposed upper tubing nozzle 128A. The central output axis 127A is at approximately a twenty degree angle with respect to the gas flow direction A and the central output axis 129A is likewise at an approximately twenty degree angle with respect to the gas flow direction A. The gas flow direction A is generally indicative of the direction of gas flow moving through abatement chamber when misting array 120 is in the installed position.

Figure 8B:
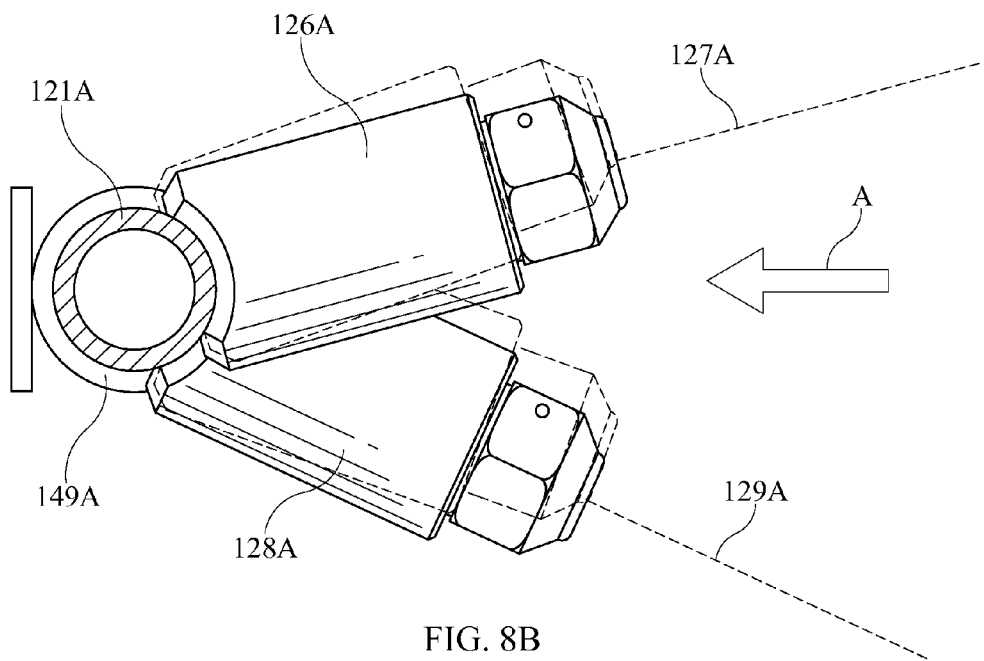
FIG. 8B illustrates a section view similar to FIG. 8A, but showing the upper nozzle tubing fixedly rotationally adjusted to a second position; phantom lines of FIG. 8B depict nozzles of the upper nozzle tubing in the first position of FIG. 8A.
Figure 9:
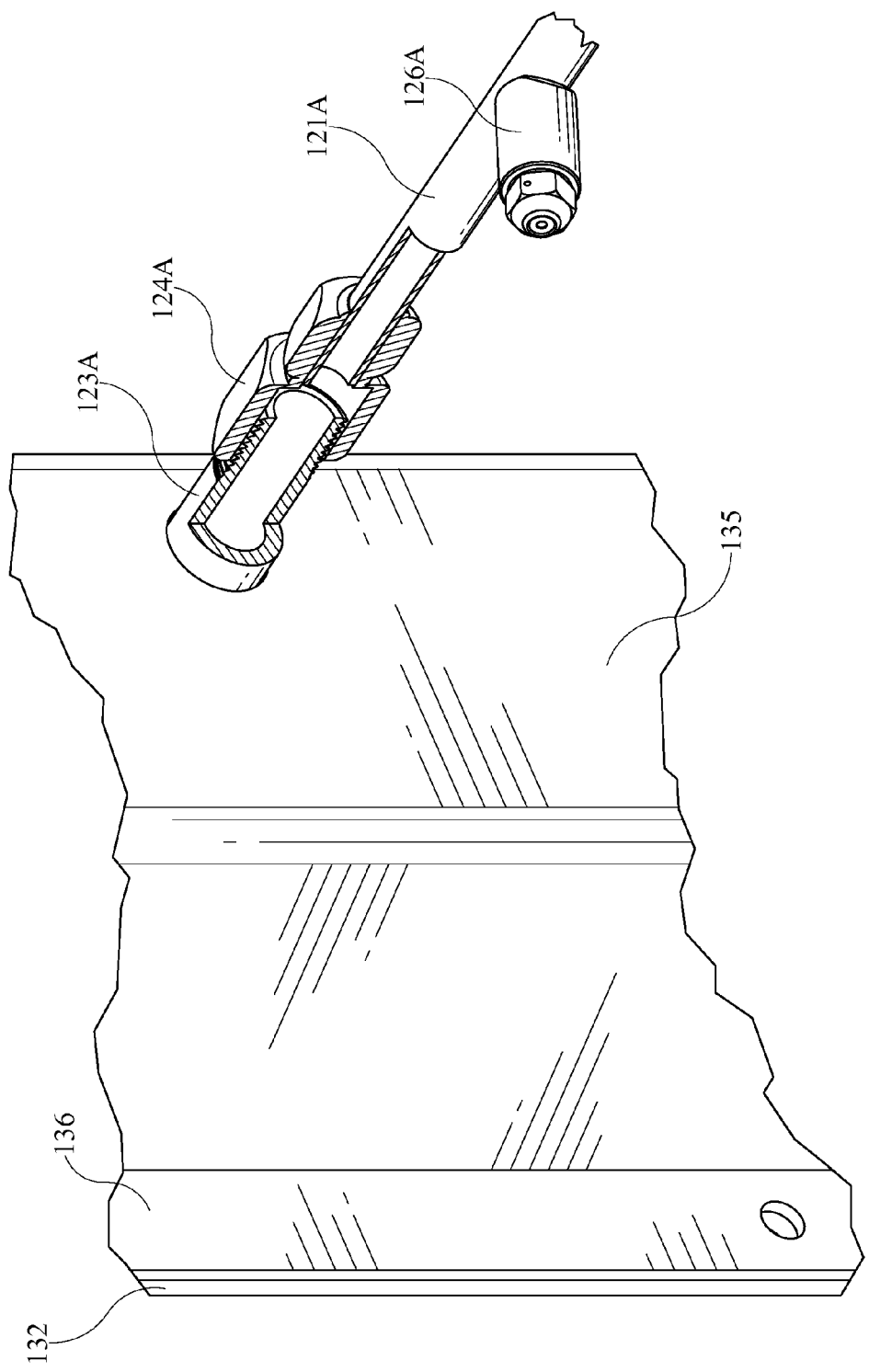
FIG. 9 illustrates a close-up view showing a portion of a sealing piece and a pipe nipple, a female tube fitting, and a nozzle section of an upper nozzle tubing of the first misting array of the first embodiment of the abatement system; portions of the pipe nipple, the female tube fitting, and the nozzle section of the nozzle tubing are shown in section.

Referring to FIG. 8B, the upper nozzle section 121A is illustrated adjusted to a second rotational orientation. The phantom lines in FIG. 8B depict the first rotational orientation of the upwardly disposed upper tubing nozzle 126A and the downwardly disposed upper tubing nozzle 128A. In the second rotational orientation of FIG. 8B a central output axis 127A of the visible upwardly disposed upper tubing nozzle 126A is still at approximately a forty degree angle with respect to a central output axis 129A of the visible downwardly disposed upper tubing nozzle 128A. The central output axis 127A is at approximately a fifteen degree angle with respect to the gas flow direction A and the central output axis 129A is approximately at a twenty-five degree angle with respect to the gas flow direction A. Accordingly, the second rotational orientation of the upper nozzle section 121A is offset approximately five degrees with respect to the first rotational orientation. In alternative embodiments the upper nozzle section 121A may optionally be fixed at a non-rotationally adjustable orientation.

Figure 5:
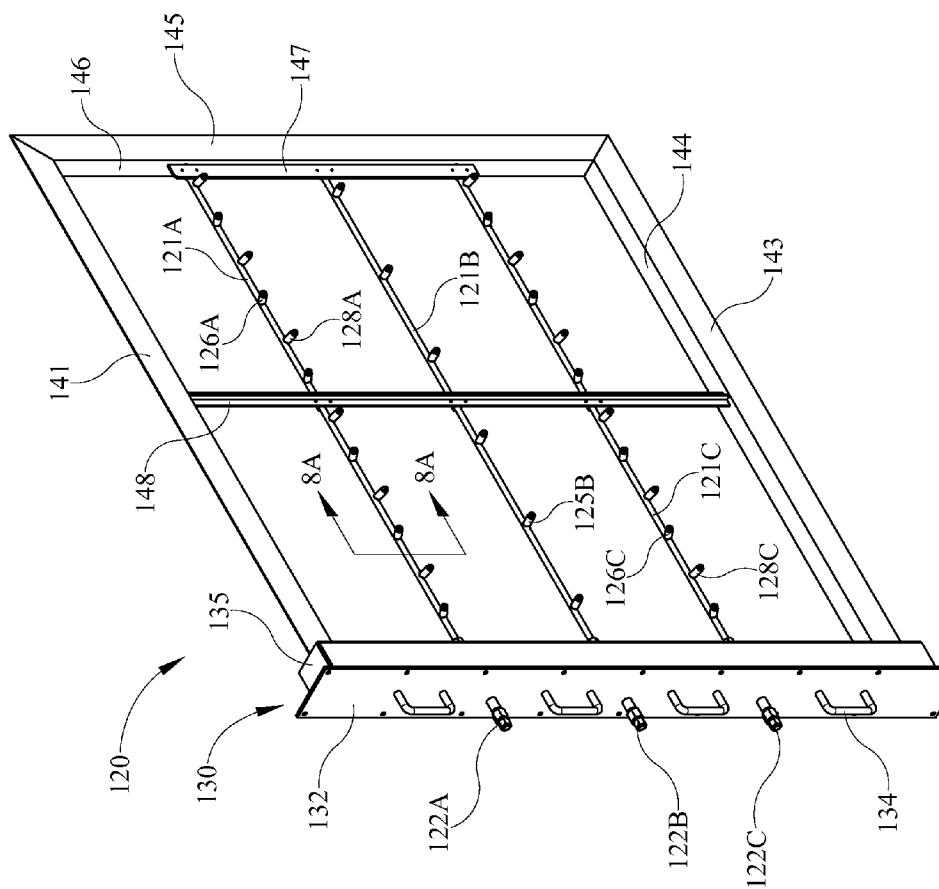
FIG. 5 illustrates a perspective view of a first misting array of the abatement system of FIG. 1.
Figure 6:
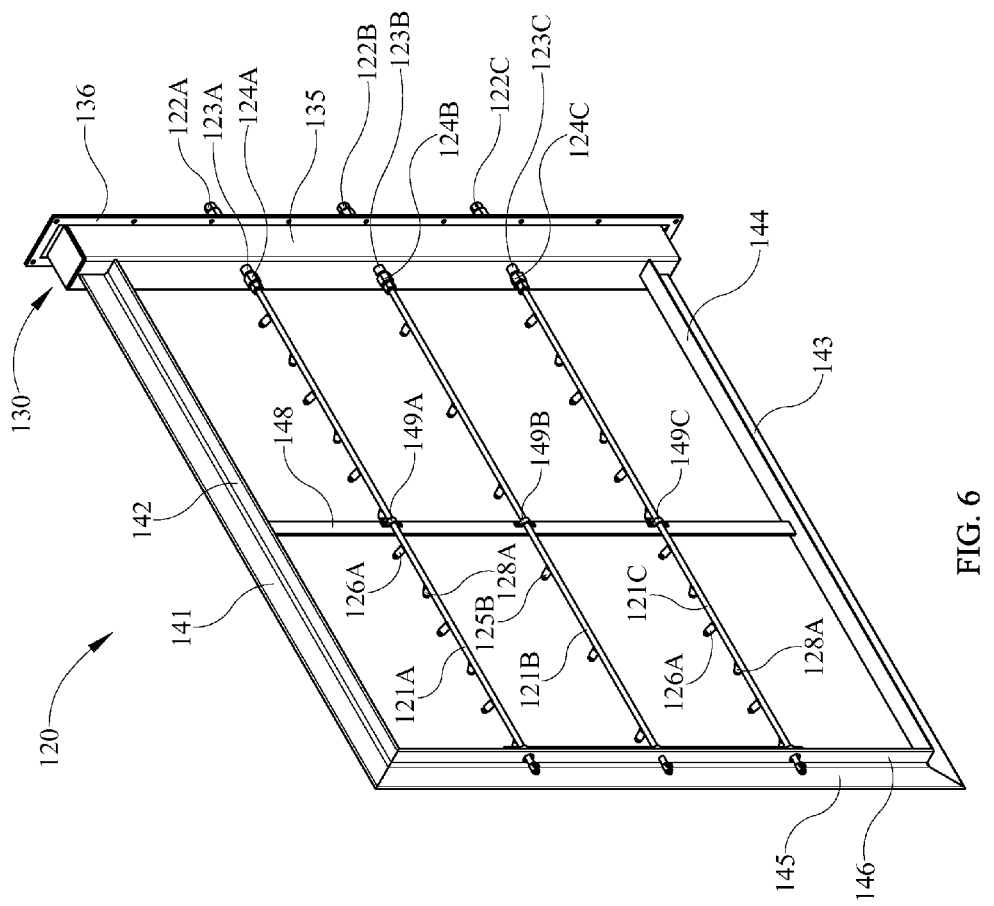
FIG. 6 illustrates an additional perspective view of the misting array of FIG. 5.
Figure 7:
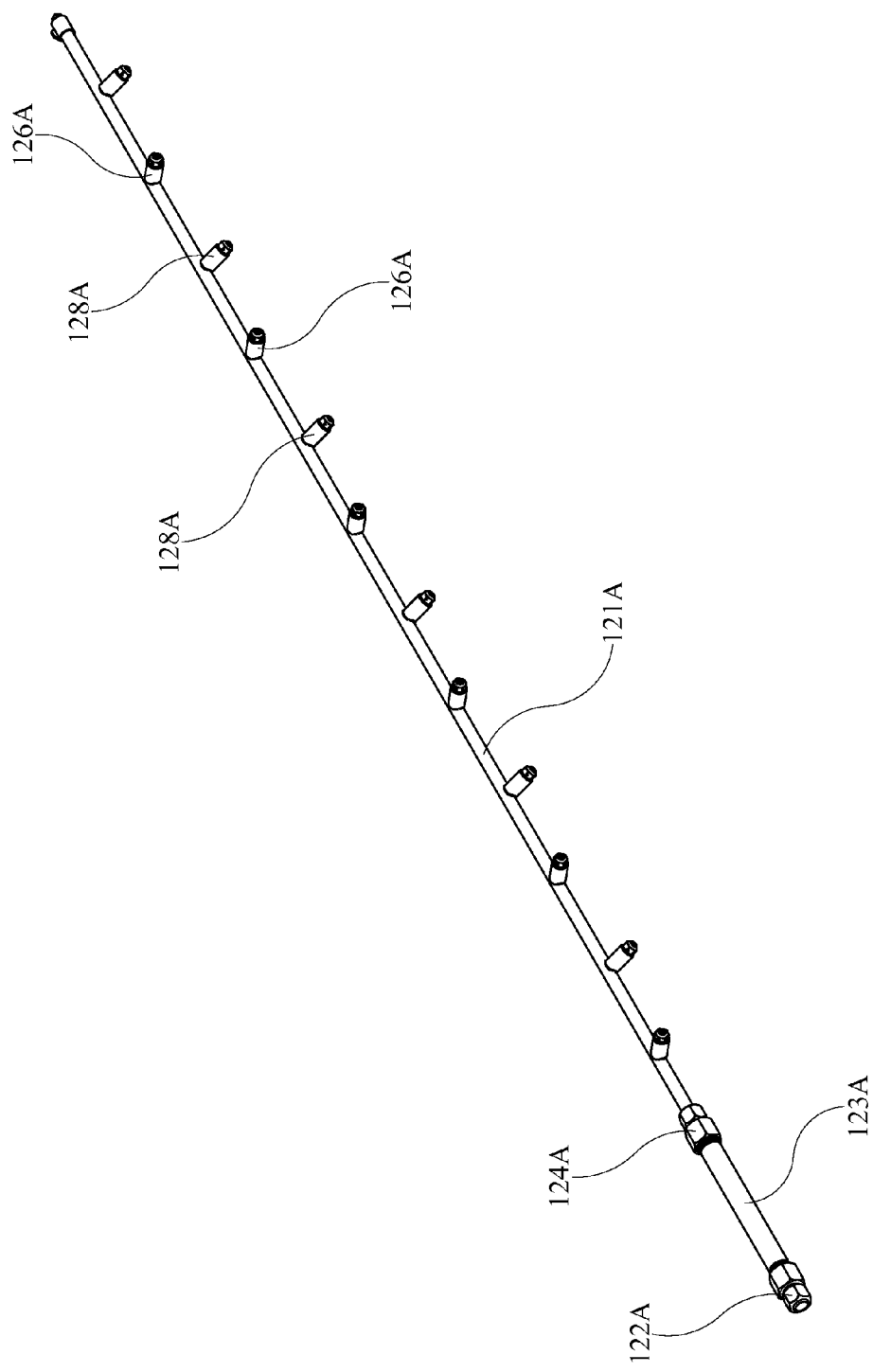
FIG. 7 illustrates an upper nozzle row of the misting array of FIG. 5.

Referring to FIG. 5 and FIG. 6, the middle nozzle section 121B includes six commonly oriented nozzles 125B. The commonly oriented nozzles 125B are shown fixed at a rotational orientation such that the central output axes thereof are directed substantially directly counter to the direction of gas flow within the abatement chamber when the misting array 120 is in the installed position. In alternative embodiments one or more of the nozzles 125B may be positioned such that the nozzle output central axis thereof is directed with the direction of the gas flow. The rotational orientation of the middle nozzle section 121B (and, resultantly the commonly oriented nozzles 125B) may be adjusted in a similar manner as described with respect to upper nozzle section 121A through loosening and tightening of female tube fitting 124B. In alternative embodiments the middle nozzle section 121B may optionally be fixed at a non-rotationally adjustable orientation.

The lower nozzle section 121C includes six upwardly disposed lower tubing nozzles 126C and six downwardly disposed lower tubing nozzles 128C. The upwardly disposed lower tubing nozzles 126C and the downwardly disposed lower tubing nozzles 128C are alternately provided on the lower nozzle section 121C. Each of the upwardly disposed lower tubing nozzles 126C and each of the downwardly disposed lower tubing nozzles 128C has a nozzle output central axis that is directed counter to the direction of gas flow through the abatement chamber when the first misting array 120 is in the installed position. In alternative embodiments one or more of the upwardly disposed lower tubing nozzles 126C and/or one or more of the downwardly disposed lower tubing nozzles 128C may be positioned such that the nozzle output central axis thereof is directed with the direction of the gas flow. In the depicted embodiment the nozzle output central axis of each upwardly disposed lower tubing nozzle 126C is at approximately a forty degree angle with respect to a central output axis of each downwardly disposed lower tubing nozzle 128C. Also, in the depicted embodiment the central output axis of each upwardly disposed lower tubing nozzle 126C and each downwardly disposed lower tubing nozzle 128C is at approximately a twenty degree angle with respect to the gas flow within the abatement chamber when the misting array 120 is in an installed position. The rotational orientation of the lower nozzle section 121C may be adjusted in a similar manner as described with respect to upper nozzle section 121A through loosening and tightening of female tube fitting 124C. In alternative embodiments the lower nozzle section 121C may optionally be fixed at a non-rotationally adjustable orientation.

Figure 10:
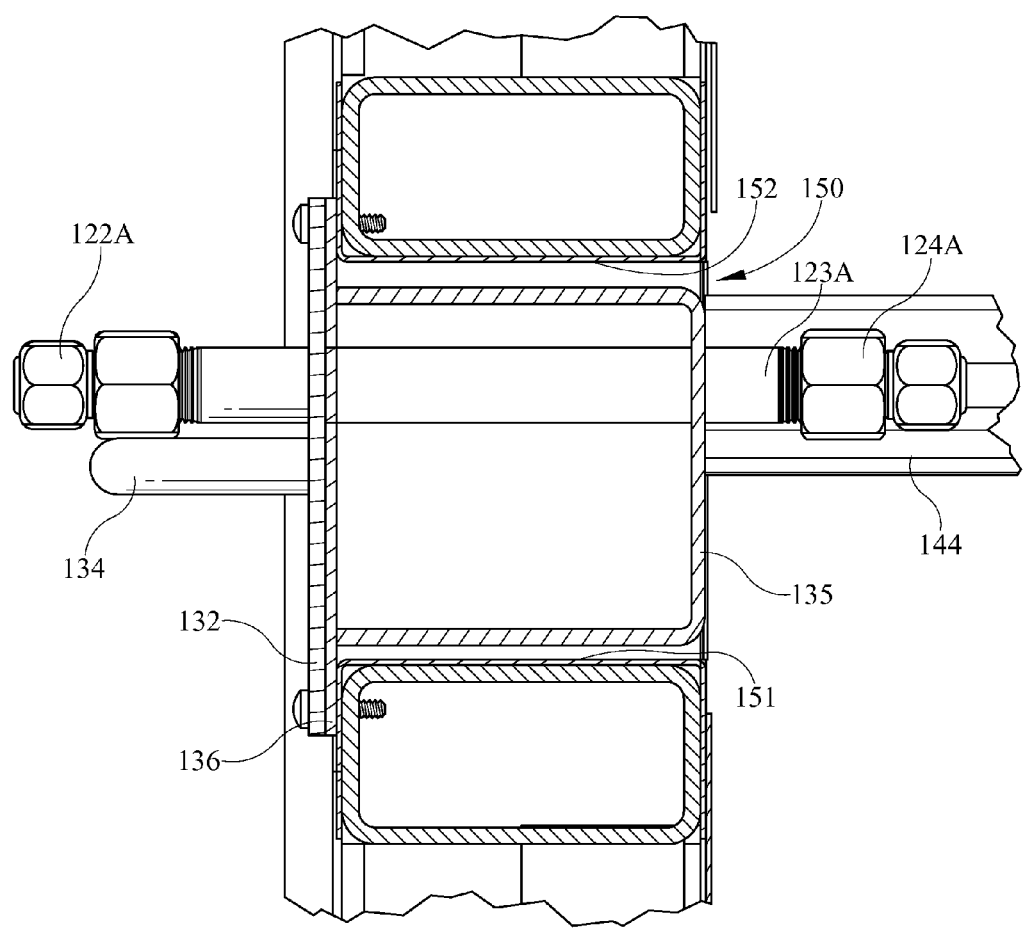
FIG. 10 illustrates a close-up top section view of a portion of the abatement system taken along the section line 10-10 of FIG. 3; portions of the sealing piece of the first misting array, the upper nozzle tubing of the first misting array, and the first misting array opening are shown.

As shown for example in FIG. 5 and FIG. 6, a plurality of fastener apertures are provided along the periphery of the exterior face of the sealing plate 132 and extend through the interior face of the sealing plate 132. The fastener apertures also extend through a gasket 136 (shown in FIG. 5 and FIG. 10) provided along the periphery of the rear face of the sealing plate 132. As shown in FIG. 10, when the misting array 120 is placed in an inserted position, the gasket 136 abuts a shell of the abatement system 100. Fasteners may be inserted through the fastener apertures of the sealing plate 132 and received in corresponding receiving apertures in the shell of the abatement system 100 to thereby sealingly and securely couple the sealing plate 132 over a first misting array opening 150 of the abatement system 100. The gasket 136 may enhance the seal between the sealing plate 132 and the shell of the abatement system 100.

With continuing reference to FIG. 10, the first misting array opening 150 of the abatement system 100 extends between the abatement chamber and the external environment when the misting array 120 is removed. The first misting array opening 150 includes misting array opening sidewalls 151 and 152. When the misting array assembly 120 is in the inserted position (as depicted in FIG. 10) the sealing piece extension 135 is in substantial conforming fit with the misting array opening 150. In particular, the sealing piece extension 135 is adjacent sidewalls 151 and 152 and is substantially planar with a surface of the abatement chamber. Having the sealing piece extension 135 be in substantial conforming fit may prevent air from leaking in from and/or out through the first misting array opening 150 and/or may minimize turbulence in gas flow in the abatement chamber as it moves by the first misting array opening 150.

In some embodiments the nozzles 126A, 126C, 128A, 128C, and 125B of misting array 120 may be Model SP 1.0S1J nozzles available from Parker Hannifin Corp. (Cleveland, Ohio) having a flow rate of approximately 0.72 GPM at 2000 PSI and having a solid cone shape distribution. In some embodiments approximately 0.95 to 1.58 GPM of liquid may be supplied to the misting array 120. Other nozzles may of course be used and, if necessary, appropriate adjustments made to misting array 120 to accommodate such other nozzles. In some embodiments the upper, middle, and lower nozzle sections 121A, 121B, and 121C may be half inch tubing with a 0.065" wall, the female tube fittings 124A, 124B, and 124C may be half inch female tube fittings, and the pipe nipples 123A, 123B, and 123C may be half inch NPT pipe nipples.

Although the first misting array 120 has been described in detail herein, one of ordinary skill in the art, having had the benefit of the present disclosure will recognize that other configurations of the misting array 120 may be utilized in other embodiments. For example, more or fewer nozzles may be provided on one or more of the nozzle sections. Also, for example, one or more portions of nozzle tubing may be non-linear (e.g., curvate, circular, elliptical, curvilinear, rectangular, triangular), non-perpendicular with respect to the gas flow moving through the abatement chamber, and/or may be non-parallel with respect to other nozzle tubing. Also, for example, the angle of one or more nozzles with respect to one or more other nozzles on a given nozzle section may be unique from other nozzles on the nozzle section. Also, for example, if upwardly and downwardly disposed nozzles are provided on a nozzle section they may be non-alternatingly provided, may be provided with some non-upwarldly and non-downwardly disposed nozzles, and/or may each be provided at a unique rotational angle about a nozzle section. Also, for example, the frame structure may be modified to interact with an abatement chamber having a different geometric configuration or may have a geometric structure that is non-conforming with an abatement chamber. Also, for example, the sealing piece 130 may be configured to interact with a first misting array opening and/or a shell having a different configuration. For example, the sealing piece 130 may be configured to interact with one or more openings that extend through a side of an abatement system and also through the top of the abatement system. Also, for example, in some embodiments the size of the abatement chamber may be increased or decreased and the amount of nozzle tubing, nozzles, and/or arrangement of the nozzle tubing and/or nozzles may be altered to provide a desired misting coverage. Also, for example, in some embodiments the nozzle tubing may comprise more or fewer pieces. Also, for example, the nozzle output central axis of one or more nozzles may be directed with the direction of gas flow through the abatement chamber when the misting array is inserted therein. Also, for example, the misting array and the abatement system may be configured for insertion of the misting array into an opening through another side (e.g., the top) of the abatement system. Also, for example, in some embodiments the nozzle output central axis of one or more nozzles may be directed with the direction of gas flow and the nozzle output central axis of one or more nozzles may be directed counter to the direction of gas flow. Also, for example, in some embodiments the nozzle output central axis of one or more nozzles on a nozzle tubing may be directed at an intersecting angle with respect to one or more nozzles on the same nozzle tubing.

Figure 3:
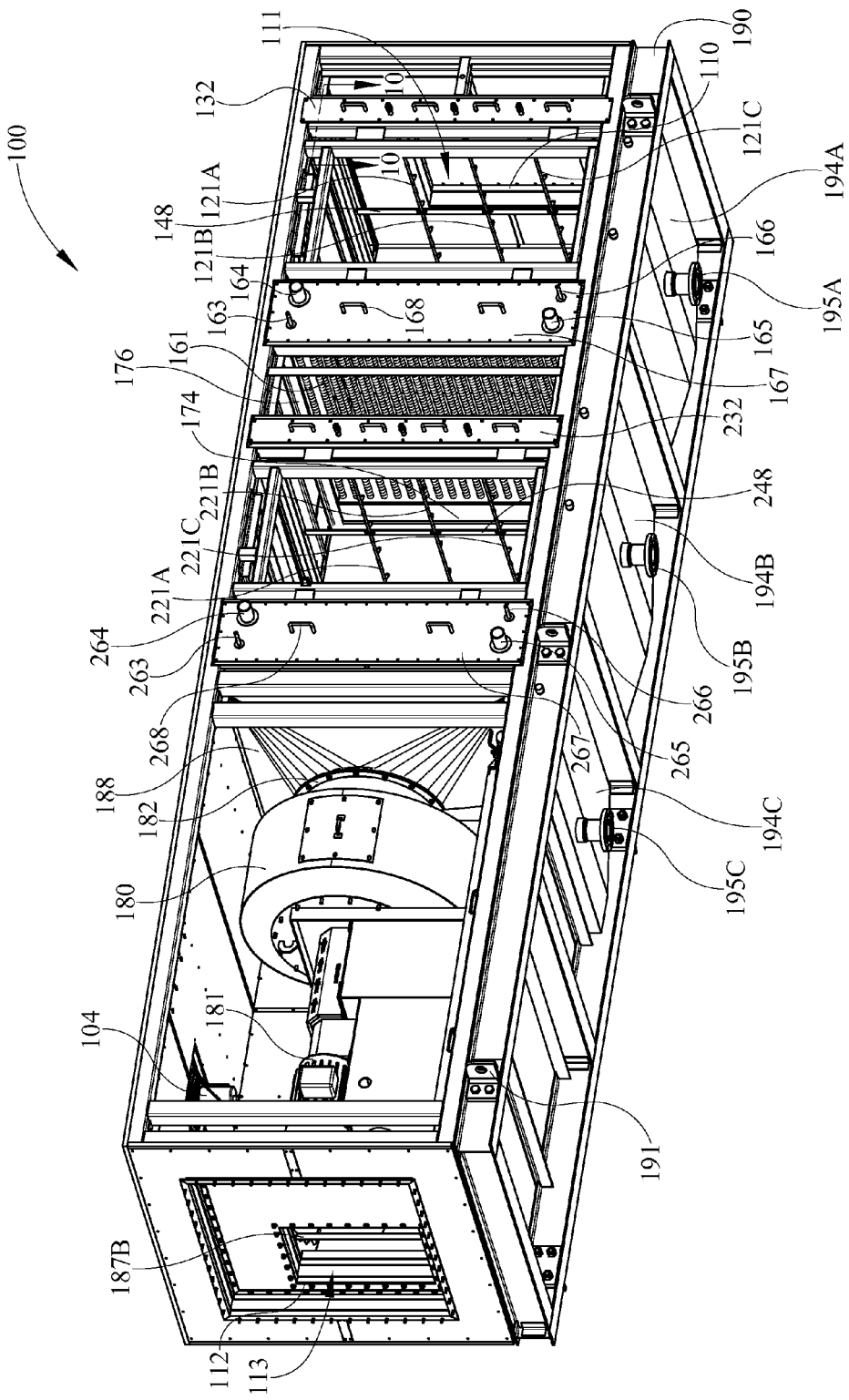
FIG. 3 illustrates a lower access side and exhaust side perspective view of the first embodiment of the abatement system; portions of a shell and portions of an abatement chamber on an access side of the abatement system have been removed therefrom in order to provide a better view of various components of the abatement system.
Figure 4:
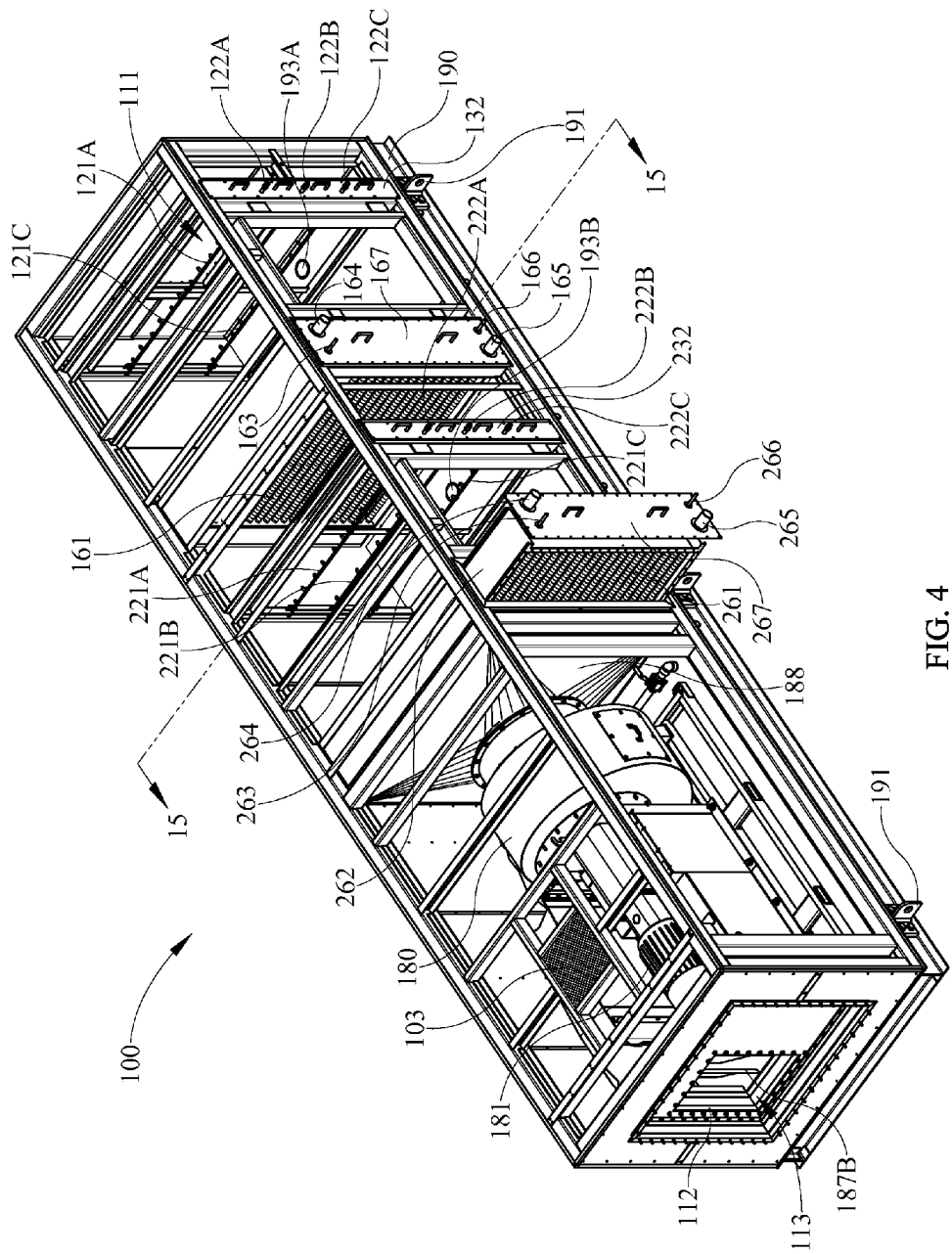
FIG. 4 illustrates an upper access side and exhaust side perspective view of the first embodiment of the abatement system; portions of a shell on an access side and a top of the abatement system have been removed and portions of an abatement chamber on an access side and a top of the abatement system have been removed in order to provide a better view of various components of the abatement system.

Referring again to FIG. 1 through FIG. 4, downstream of the first misting array 120 is a first condensing coil assembly 160, which is shown exploded away from the abatement system 100 in a removed position in FIG. 2. The first condensing coil assembly 160 may remove and/or recover heat from gas flow within the abatement chamber. The first condensing coil assembly 160 includes condensing coils 161 supported by a coil frame 162. The condensing coils 161 are in communication with a vent connection 163, a return connection 164, a supply connection 166, and a drain connection 166, all of which extend through openings in a first condensing coil assembly sealing plate 167. The sealing plate 167 includes vertically aligned handles 168 that, as will be described in additional detail herein, may aid in the removal of the first condensing coil assembly 160 from the abatement chamber. In some embodiments the condensing coil frame 162, the condensing coils 161, and the corresponding connections 163-166 may be Type CP Coils, Model No. CP-AL-36-54-6 Left, available from Aerofin Heat Transfer Products (Lynchburg, Va.). However, one of ordinary skill in the art having had the benefit of the present disclosure will recognize that other condensing coils may be utilized in combination with the abatement system 100 described herein or with other abatement systems. When the condensing coil assembly 160 is in the inserted position, as shown in FIGS. 1, 3, and 4, the condensing coils 161 are situated across the gas flow moving through the abatement chamber in a direction generally perpendicular to the gas flow. The condensing coils 161 are positioned in a first condensing section of the abatement chamber when the condensing coil assembly 160 is in the inserted position.

Figure 14:
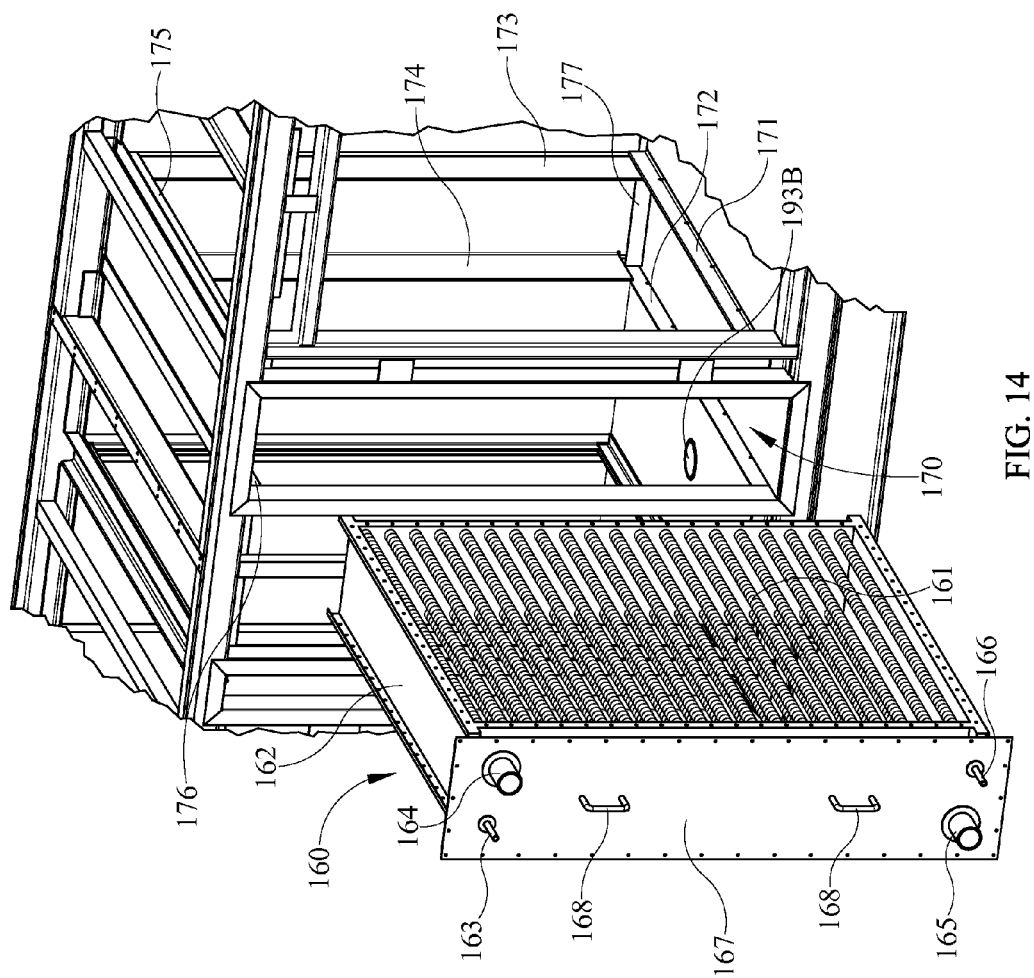
FIG. 14 illustrates a close-up perspective view of the first embodiment of the abatement system showing the first condensing coil assembly exploded away in a removed position; portions of a shell on an access side and a top of the abatement system have been removed and portions of an abatement chamber on an access side and a top of the abatement system have been removed in order to provide a better view of various components of the abatement system.

Referring to FIG. 14, a close-up perspective view of the abatement system 100 shows the first condensing coil assembly 160 in a removed position. Portions of a shell on an access side of the abatement system 100 and a top of the abatement system 100 and portions of the access side and top side of the abatement chamber have been removed in order to provide a better view of a condensing coil track structure within the abatement chamber. The track structure is accessible through a first condensing coil opening 170 that extends from the abatement chamber to the external environment. The track structure includes a lower track front flange 171 and an opposed lower track rear flange 172; a side track front flange 173 and an opposed side track rear flange 174; and an upper track front flange 175 and an opposed upper track rear flange 176. When the first condensing coil assembly 160 is inserted into the first condensing coil opening 170, the frame structure member 162 is guided by the track structure. A stop plate 177 is optionally provided interposed between the lower track front flange 171 and the lower track rear flange 172 to prevent the condensing coil assembly 160 from being inserted into the abatement chamber beyond a certain depth.

Figure 15:
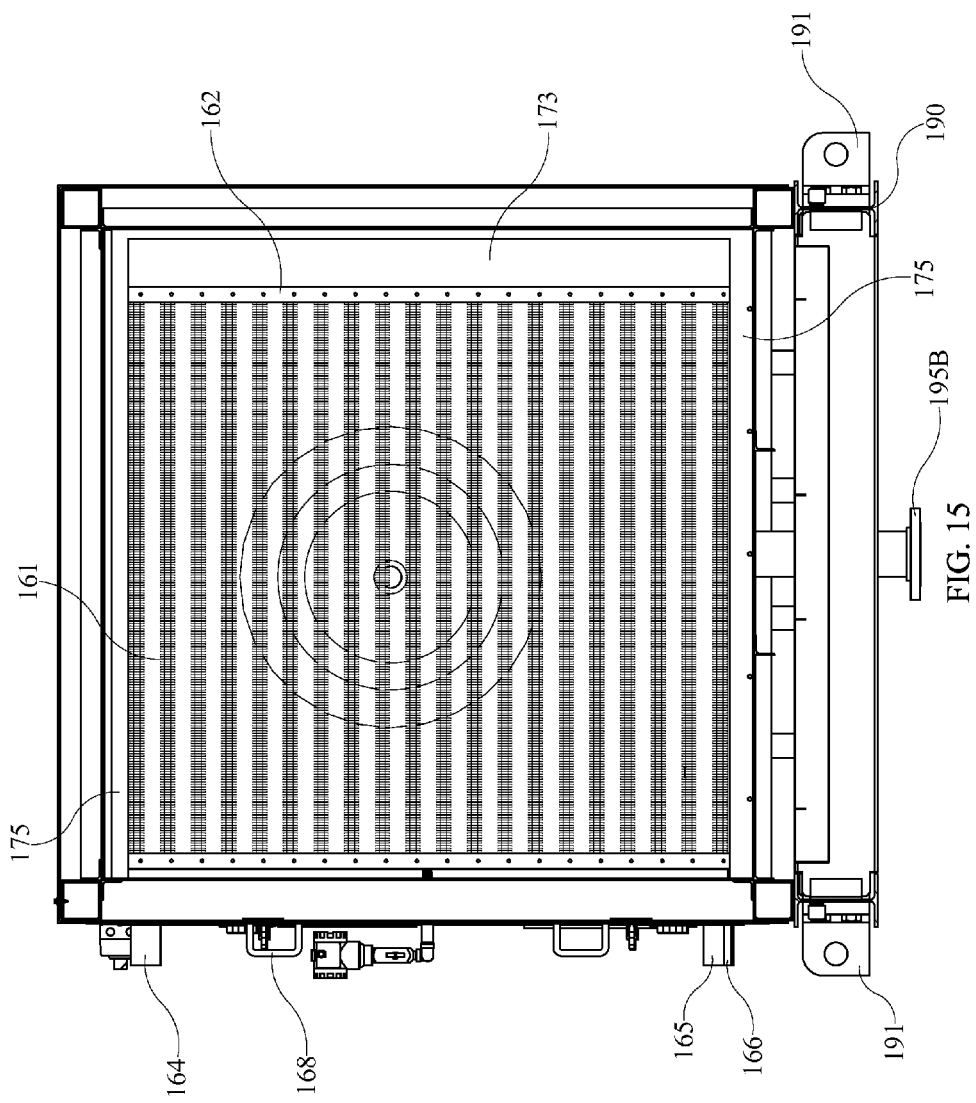
FIG. 15 illustrates a section view of the first embodiment of the abatement system taken along the section line 15-15 of FIG. 4.

As shown in FIG. 15, which shows the first condensing coil assembly 160 in the inserted position, it can be seen that the track structure abuts and/or overlaps the frame structure member 162, thereby forcing a substantial majority of the gas flow through the condensing coils 161. In other embodiments alternative track structure may be provided in the abatement chamber and configured to interact with coil frame 162 or a coil frame having an alternative construction than coil frame 162. Also, in some embodiments track structure may be integrated into the coil frame 162 and interact with a corresponding extension/blade or other structure extending from the abatement chamber.

As shown for example in FIG. 14, a plurality of fastener apertures are provided along the periphery of the front face of the sealing plate 167 and extend through the rear face of the sealing plate 167. The fastener apertures also optionally extend through a gasket that may be provided along the periphery of the rear face of the sealing plate 167. When the condensing coil 160 is placed in an inserted position in the abatement chamber, the sealing plate 167 abuts a shell of the abatement system 100. Fasteners may be inserted through the fastener apertures of the sealing plate 167 and received in corresponding receiving apertures in the shell of the abatement system 100 to thereby sealingly and securely couple the sealing plate 167 over the first condensing coil opening 170. The optional gasket may enhance the seal between the sealing plate 167 and the shell of the abatement system 100.

Referring again to FIG. 1 and FIG. 2, interposed between the first misting array 120 and the first condensing coil assembly 160 is a first access door 101A that enables access to portions of the abatement chamber between the first misting array 120 and the first condensing coil assembly 160. In its closed position, the first access door 101A creates a substantially sealed barrier between the abatement chamber and the exterior environment. The first access door 101A may optionally be omitted in some embodiments. The first access door 101A and other portions of the shell of the abatement system 100 are shown omitted from FIG. 3 and FIG. 4 in order to provide a better view of internal components of the abatement system 100 and their positioning within the abatement chamber. Portions of the abatement chamber are also omitted from FIG. 3 and FIG. 4.

Referring again to FIG. 1 through FIG. 4, downstream from the first condensing coil assembly 160 is a second misting array 220, which is shown exploded away from the abatement system 100 in a removed position in FIG. 2. When a misting array (or one or more components of a misting array) is described herein as being in a removed position or being removed or removable from the abatement chamber, it does not require (but can include) that the misting array (or one or more components) actually be separated from the abatement system. Moreover, being in a removed position or being removed or removable from the abatement chamber does not require (but can include) that the misting array (or one or more components) be completely removed from the abatement chamber. Rather, being in a removed position or being removed or removable from the abatement chamber only requires that at least some of the misting array that is within the abatement chamber and in contact with the gas flow of the abatement chamber when the misting array is in the inserted position is at least partially removed from the gas flow within the abatement chamber. In the depicted embodiment the second misting array 220 shares the same configuration with misting array 120, but is simply in a different position within abatement system 100. Accordingly, description concerning many aspects of misting array 220 is omitted herein for purpose of conciseness. However, it is understood that those aspects of misting array 220 having numbering of 2XX share a common configuration with those aspects of misting array 120 having numbering of 1XX. For example, sealing plate 232 has a common configuration as sealing plate 132.

Although the first misting array 120 and second misting array 220 are depicted and described herein as having a common configuration, it is understood that in alternative embodiments an abatement system may be provided wherein a plurality of misting arrays are provided, and one or more of the misting arrays may have a configuration that is distinct in one or more aspects from one or more other misting arrays of the abatement system. For example, one or more misting arrays may have more or fewer nozzles than one or more other misting arrays, may have a different nozzle arrangement than one or more other misting arrays and/or may have a different frame structure than one or more other misting arrays.

Figure 11:
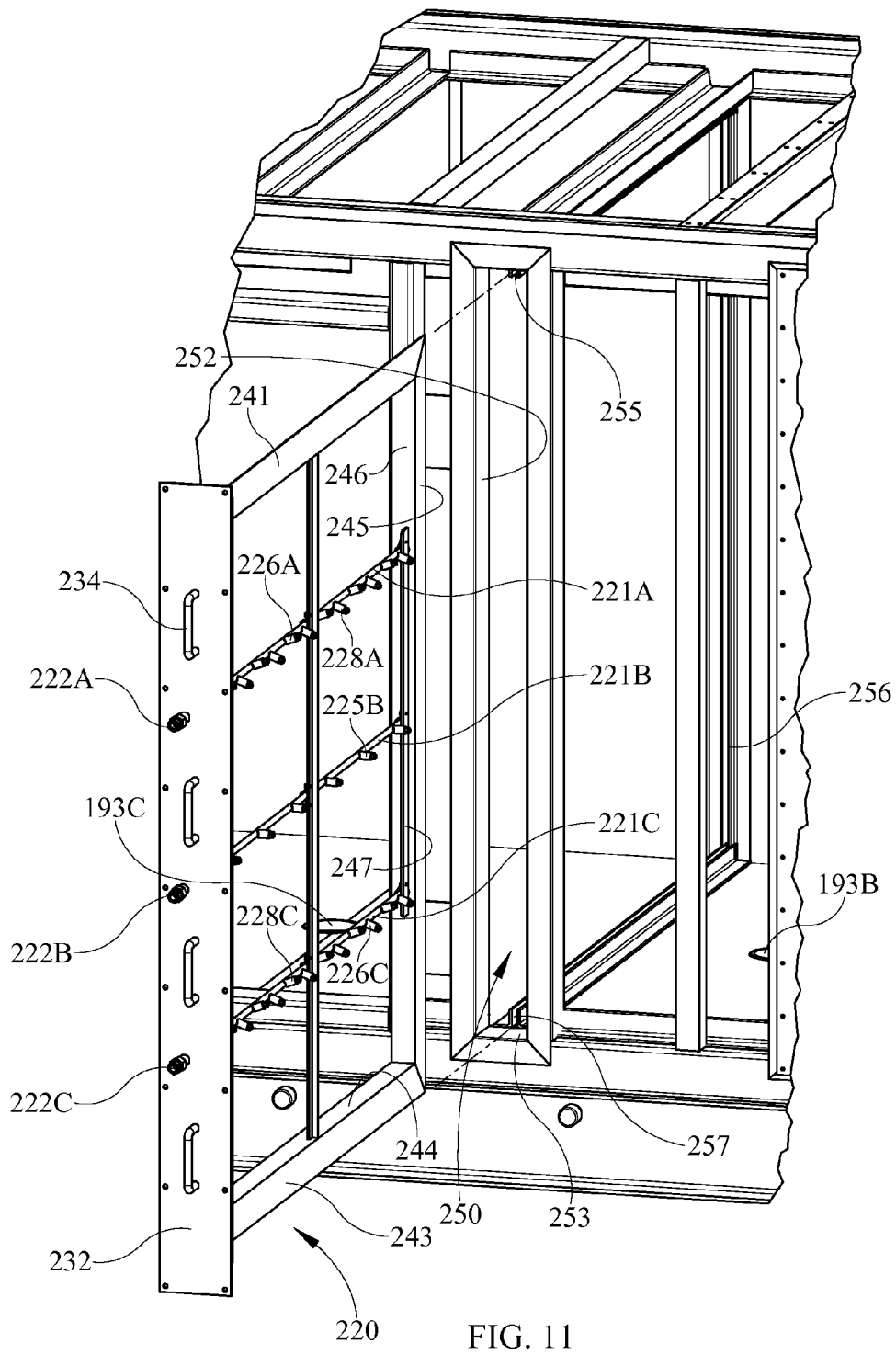
FIG. 11 illustrates a close-up perspective view of the first embodiment of the abatement system showing the second misting array assembly exploded away in a removed position; portions of a shell on an access side and a top of the abatement system have been removed and portions of an abatement chamber on an access side and a top of the abatement system have been removed in order to provide a better view of various components of the abatement system.

Referring now to FIG. 11, a close-up perspective view of the abatement system 100 shows the second misting array 220 in a removed position. Portions of a shell on an access side of the abatement system 100 and a top of the abatement system 100 and portions of an access and top side of an abatement chamber have been removed in order to provide a better view of a second misting array track structure within the abatement chamber. The second misting array track structure is accessible through a second misting array opening 250 that extends from the abatement chamber to the external environment when second misting array 220 is in the removed position. The misting array opening 250 includes a first sidewall 251 and opposed second sidewall 252, and a lower wall 253 and opposed upper wall 254. The misting array track structure includes a lower track 257 having a lower track front flange and an opposed lower track rear flange; a side track 256 having a side track front flange and an opposed side track rear flange; and an upper track 255 having an upper track front flange and an opposed upper track rear flange. When the second misting array 220 is inserted into the second misting array opening 250, the frame structure thereof is guided by the track structure extending from the abatement chamber. In particular, the upper frame structure member 241 is guided by the upper track 255, the lower frame structure member 243 is guided by the lower track 257, and the side frame structure member 245 is engaged within the side track 256 when the second misting array 220 is in the inserted position.

When the second misting array 220 is fully inserted, the upper track 255 will overlap the upper frame structure member 241, the lower track 257 will overlap the lower frame structure member 243, and the side track 256 will overlap the side frame structure member 245. Accordingly, the second misting array 220 may be securely maintained in position and a majority of the gas flow through the second misting section the abatement chamber may be directed within the frame structure of the second misting array 220. In a similar manner as described with respect to the first misting array 120, when the second misting array 220 is placed in an inserted position in the abatement chamber, the sealing plate 232 will abut a shell of the abatement system 100. Fasteners may be inserted through the fastener apertures of the sealing plate 232 and received in corresponding receiving apertures in the shell of the abatement system 100 to thereby sealingly and securely couple the sealing plate 232 over the second misting array opening 250. A gasket may optionally be interposed between the sealing plate 232 and the shell of the abatement system 100 to enhance the seal.

In the abatement system 100, first misting array track structure that interacts with frame structure of the first misting array 120 is also provided in the abatement chamber. The first misting array track structure is accessible through the first misting array opening 150. Optionally, the first misting array track structure may include a lower track having a lower track front flange and an opposed lower track rear flange; a side track having a side track front flange and an opposed side track rear flange; and an upper track having an upper track front flange and an opposed upper track rear flange. When the first misting array 120 is inserted into the first misting array opening 150, the frame structure thereof may be guided by the track structure extending from the abatement chamber. Accordingly, in some embodiments both the first misting array 120 and the second misting array 220 may be slidably removable from the abatement system 100.

Although the track structures accessible through first misting array opening 150 and second misting array opening 250 have been described in detail herein and the frame structures of first and second misting arrays 120 and 220 have also been described, one of ordinary skill in the art, having had the benefit of the present disclosure will recognize that other configurations of the track structure and/or frame structure may be utilized. For example, in some embodiments alternative track structure may be provided through first misting array opening 150 and configured to interact with the same or alternative frame structure of first misting array 120. Similarly, in some embodiments alternative track structure may be provided through second misting array opening 250 and configured to interact with the same or alternative frame structure of second misting array 220. Also, for example, in some embodiments track structure may be integrated into the frame of first misting array 120 and/or second misting array 220 and interact with a corresponding blade or other structure extending from the abatement chamber and accessible through first misting array opening 150 and/or second misting array opening 250. Also, for example, the frame structure may be modified to interact with an abatement chamber and/or track structure having a different geometric configuration. Also, for example, in some embodiments side track structure may be omitted.

Referring again to FIG. 1 through FIG. 4, downstream of the second misting array 220 is a second condensing coil assembly 260, which is shown partially exploded away from the abatement system 100 in a partially removed position in FIG. 2. In the depicted embodiment the second condensing coil assembly 260 shares a similar configuration with first condensing coil 160, but is simply in a different position within abatement system 100. Accordingly, description concerning many aspects of second condensing coil assembly 260 is omitted herein for the purpose of conciseness. However, it is understood that those aspects of second condensing coil assembly 260 having numbering of 2XX share a common configuration with those aspects of first condensing coil assembly 160 having numbering of 1XX. For example, sealing plate 267 has a common configuration as sealing plate 167. Although first condensing coil assembly 160 and second condensing coil assembly 260 are depicted and described herein as having a common configuration, it is understood that in alternative embodiments an abatement system may be provided wherein a plurality of condensing coil assemblies are provided, and one or more of the condensing coil assemblies may have a configuration that is distinct in one or more aspects from one or more other condensing coil assemblies of the abatement system.

In the abatement system 100, second condensing coil track structure is provided in the abatement chamber and is accessible through second condensing coil opening 270 (FIG. 4). Optionally, the second condensing coil track structure may include a lower track front flange and an opposed lower track rear flange; a side track front flange and an opposed side track rear flange; and an upper track front flange and an opposed upper track rear flange. When the second condensing coil assembly 260 is inserted into the second condensing coil opening 270, the coil frame 262 thereof may be guided along the track structure extending from the abatement chamber. Accordingly, in some embodiments both the first condensing coil assembly 160 and the second condensing coil assembly 260 may be slidably removable from the abatement system 100.

When inserted in the abatement system 100, the second condensing coil assembly 260 is in a second condensing section of the abatement chamber. Moreover, the downstream side of the second condensing coil assembly 260 is generally at the end of the abatement chamber. Referring to FIG. 3 and FIG. 4, it is illustrated that a large opening end of a transition piece 188 is coupled to the end of the abatement chamber and a small opening end of the transition piece 188 is coupled a fan entrance 182 of a fan 180. The transition piece 188 acts as an intermediary structure between the larger abatement chamber and the smaller fan entrance 182.

Figure 2:
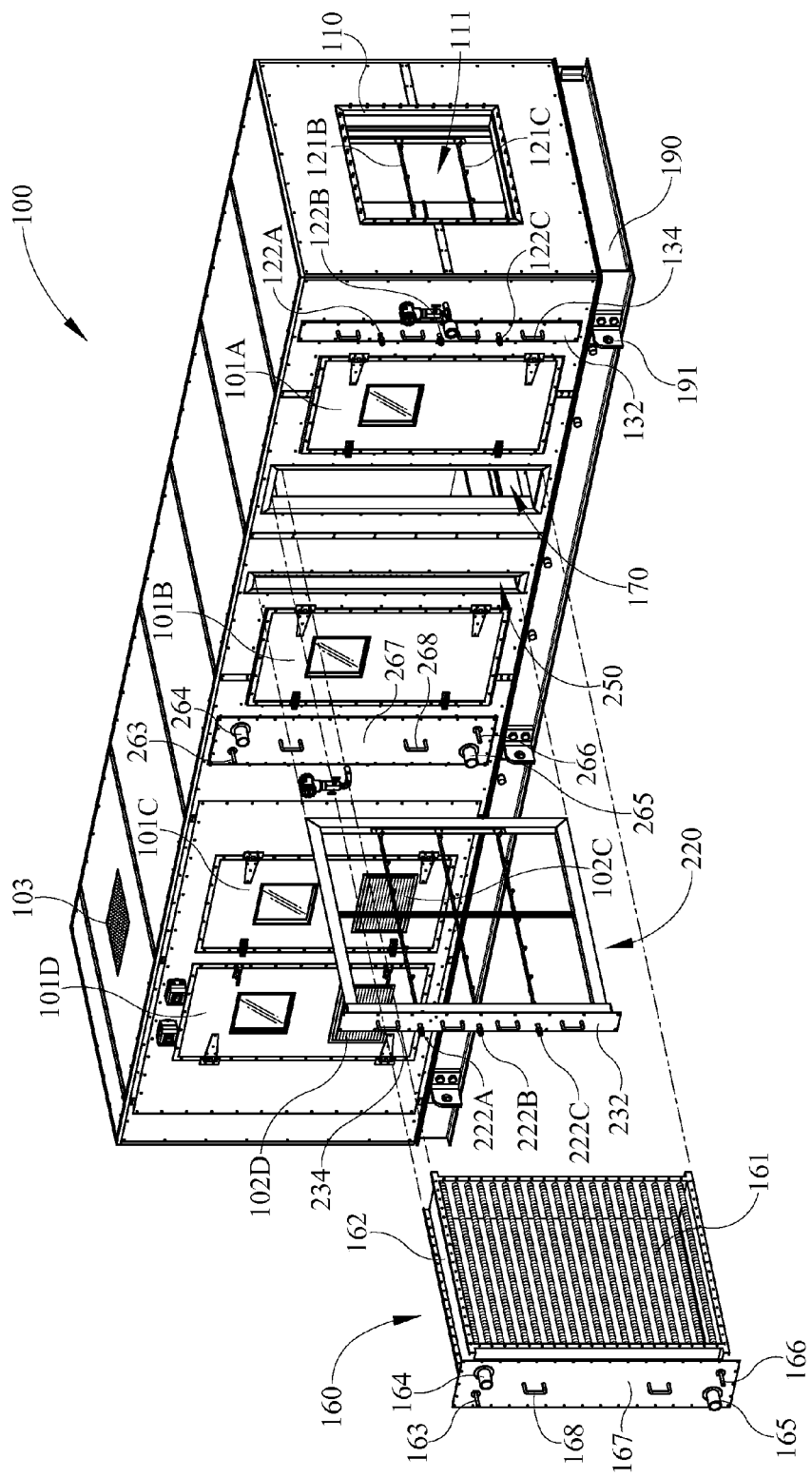
FIG. 2 illustrates an upper access side and intake side perspective view of the first embodiment of the abatement system with a first condensing coil assembly and a second misting array assembly shown exploded away from the abatement system in removed positions.

As shown in FIG. 1 and FIG. 2, interposed between the second misting array 220 and the second condensing coil assembly 260 is a second access door 101B that enables access to portions of the abatement chamber between the second misting array 220 and the second condensing coil assembly 260. In its closed position, second access door 101B creates a substantially sealed barrier between the abatement chamber and the exterior environment. The second access door 101B may optionally be omitted in some embodiments. The second access door 101B and other portions of the shell of the abatement system 100 portions of the abatement chamber are shown omitted from FIG. 3 and FIG. 4 in order to provide a better view of internal components of the abatement system 100 and their positioning within the abatement chamber.

Figure 12:
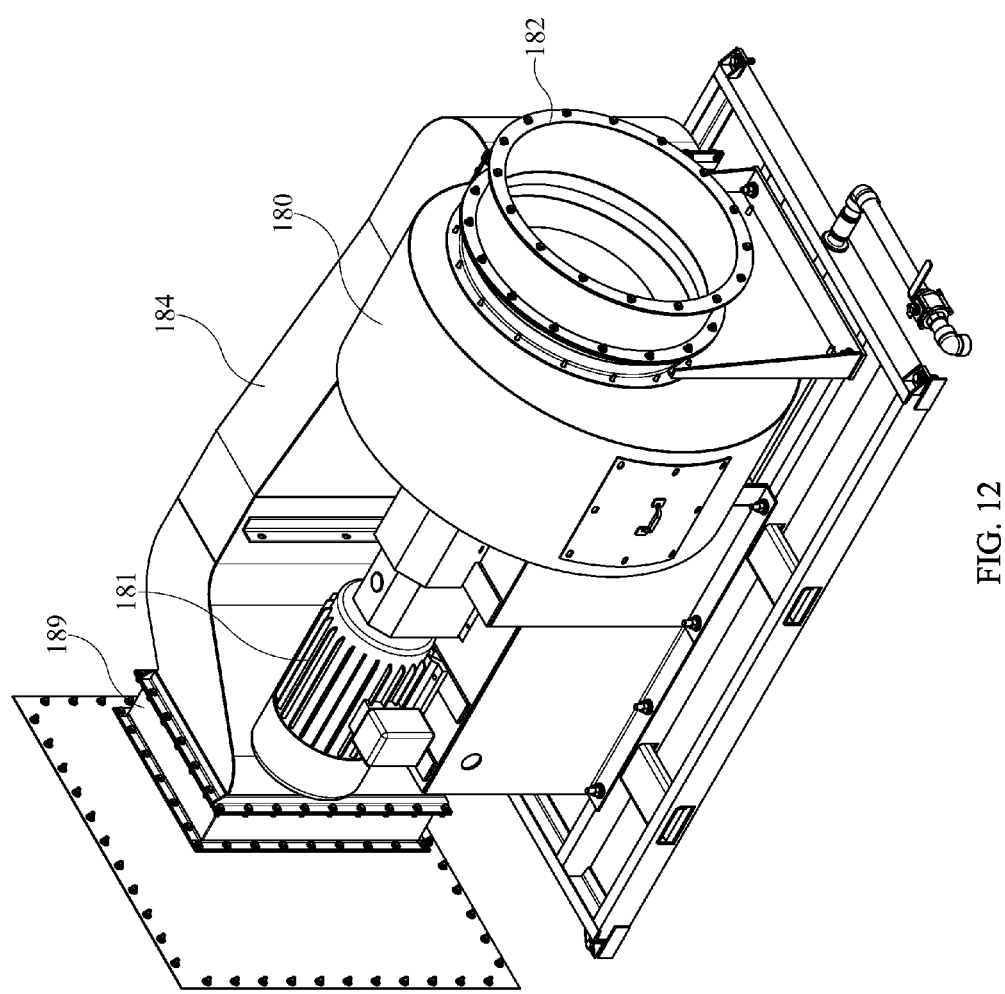
FIG. 12 illustrates a top perspective view of a fan and exhaust assembly of the first embodiment of the abatement system.
Figure 13:
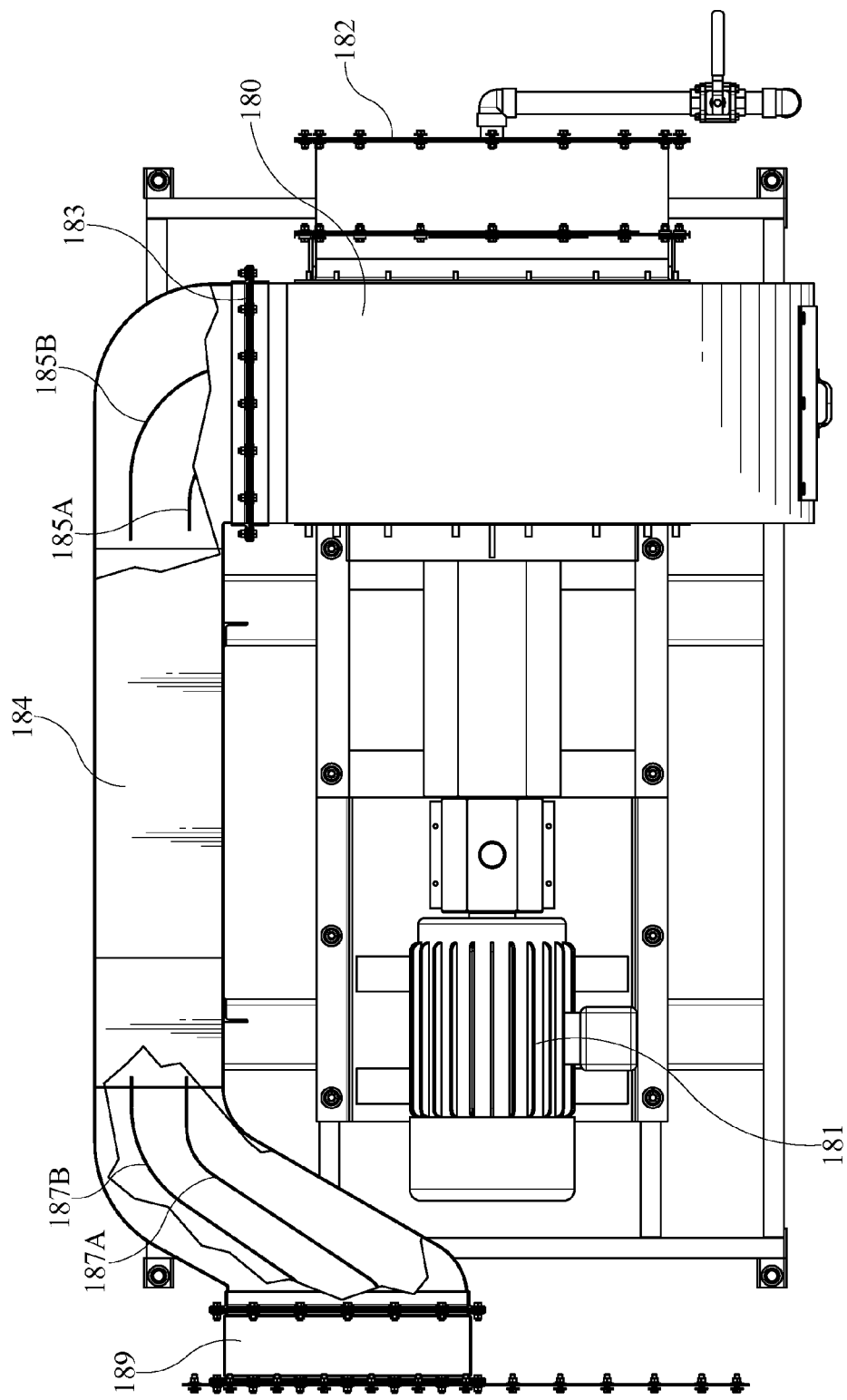
FIG. 13 illustrates a top view of the fan and exhaust assembly of FIG. 12; portions of an exhaust duct are broken away showing internal components thereof.

With continuing reference to FIG. 1 through FIG. 4, and additionally to FIGS. 12 and 13, various aspects of the fan 180 and the exhaust assembly of the abatement system 100 are described. The fan 180 is driven by a motor 181 and draws gas through air inlet 111 and through the abatement chamber when in operation. In some embodiments the fan 180 may be a Size 271 ACF, Class 3, Arrangement-8SW, CCW BH fan available from The New York Blower Company (Willowbrook, Ill.) that operates at approximately 13,500 CFM. One of ordinary skill in the art, having had the benefit of the present disclosure will recognize that other fans may be utilized and that in other embodiments fans may be utilized that have a higher or lower CFM capability. For example, in some embodiments the abatement chamber may be increased in size and a fan having larger CFM capability may be utilized.

The fan 180 also has a fan exhaust 183 that is coupled to an exhaust duct 184 and feeds gas flow received through fan entrance 182 to the exhaust duct 184. The fan 180, fan motor 181, and exhaust duct 184 are situated in a fan and exhaust chamber of the abatement system 100. The exhaust duct 184 is coupled to a transition piece 189 that defines an air outlet opening 112 (FIG. 3 and FIG. 4), which in turn defines an air outlet 113 (FIG. 3 and FIG. 4). Referring to FIG. 13, the exhaust duct 184 includes turning vanes 185A and 185B proximal its coupling with the fan exhaust 183. The turning vanes 185A and 185B extend from adjacent the fan exhaust 183 to adjacent a straight portion of the exhaust duct 184. The turning vanes 185A and 185B may help to transition exhaust from the fan to the straight portion of exhaust duct 184 and may prevent excess backpressure on the fan 180 and/or excess pressure on the exhaust duct 184. With continuing reference to FIG. 13 and additional reference to FIG. 3 and FIG. 4, the exhaust duct 184 also includes turning vanes 187A and 187B that extend from the end of the straight section of exhaust duct 184 to the transition piece 189. The turning vanes 185A and 185B may help to transition exhaust from the straight portion of exhaust duct 184 to the air outlet 113 and may prevent excess backpressure on the fan 180 and/or prevent excess pressure on the exhaust duct 184. The arrangement of the fan 180 and the exhaust duct 184 may enable the abatement system 100 to be constructed in a generally linearly extending fashion.

Heat generated by the fan 180 and fan motor 181 is vented through a fan outlet vent 103 (FIG. 1 through FIG. 4) provided between the fan and exhaust chamber and the exterior environment and is provided at the top of the abatement system 100. An outlet vent fan 104 (FIG. 3) is also included adjacent the fan outlet vent 103 to aid in the removal of heat from within the fan and exhaust chamber.

As shown in FIG. 1 and FIG. 2, third and fourth access doors 101C and 101D enable access to the fan and exhaust chamber. The third access door 101C includes an inlet vent 101C and the fourth access door 104D includes an inlet vent 101D to allow for external air to enter the fan and exhaust chamber. The third and fourth access doors 101C and 101D may optionally be omitted in some embodiments. The third and fourth access doors 101C and 101D, other portions of the shell, and portions of the abatement chamber of the abatement system 100 are shown omitted from FIG. 3 and FIG. 4 in order to provide a better view of internal components of the abatement system 100 and their positioning within the abatement chamber.

Referring to FIG. 4, FIG. 11, and FIG. 14, various drain inlets 193A-C are provided on the floor of the abatement chamber. A similar drain inlet is provided adjacent the second condensing coil assembly 260, but is not shown in the figures. The floor of the abatement chamber is sloped such that liquid is directed toward drain inlets 193A-C. Accordingly, liquid output from misting arrays 120 and 220 and/or liquid output from condensation on condensing coils 160 and 260 is directed toward drain inlets 193A-C. The liquid may contain one or more pollutants captured therein from a flue gas stream moving through the abatement chamber. Referring to FIG. 3, tanks 194A-C are visible on the base of the abatement system 100 surrounded by the support base 190. The tanks 194A-C are in flow communication with respective of the drain inlets 193A-C and collect liquid via the drain inlets 193A-C. Drain outlets 195A-C extend from the tanks 194A-C and may be coupled to piping that leads to external tanks, external treatment areas, or elsewhere in order to drain the tanks 194A-C. In some embodiments the tanks 194A-C may be omitted and the drain inlets 193A-C may be directly coupled to one or more piping that leads to external tanks, external treatment areas, or elsewhere.

Optionally, one or more components within the abatement chamber of the abatement system 100 (e.g., the condensing coil assemblies 160/260, the misting arrays 120/220) and/or the abatement chamber itself may be coated with one or more coatings to protect from corrosion. For example, one or more components may be coated with one or more coatings available from Heresite Protective Coatings (Manitowoc, Wis.).

Figure 16:
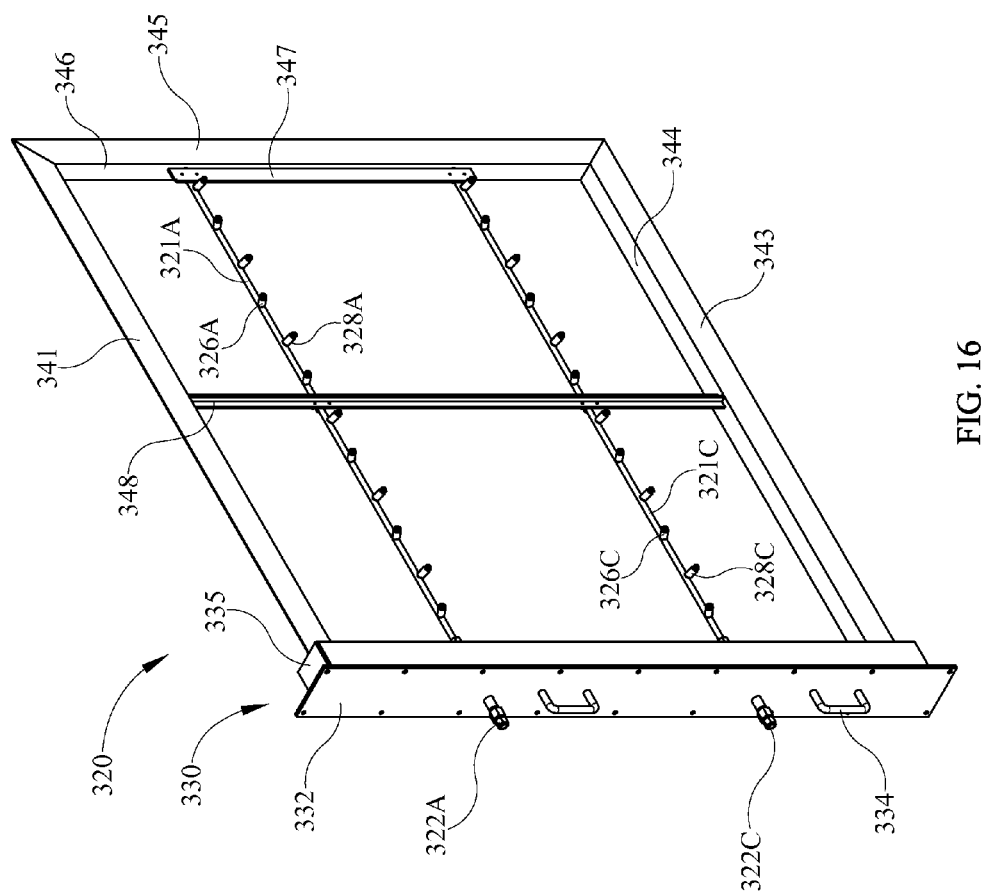
FIG. 16 illustrates a second embodiment of a misting array for use in an abatement system.

Referring now to FIG. 16, a second embodiment of a misting array 320 for use in an abatement system is illustrated. In some embodiments the misting array 320 may be utilized in an abatement system that removes pollutants from a flue gas created by the combustion of coal. The misting array 320 is similar to the first misting array 120 and the second misting array 220, but does not include a middle nozzle row. The misting array 320 includes a sealing piece 330 having a sealing plate 332 and a sealing plate extension 335. Two handles 334 are provided on an exterior face of the sealing plate 332. A frame structure is coupled to and extends from the sealing piece 330 and includes an upper frame structure member 341 having an upper frame structure rim portion (not shown), a side frame structure member 345 having a side frame structure rim portion 346, and a lower frame structure member 343 having a lower frame structure rim portion 344. The frame structure also includes a middle support bar 348 and a side support bar 347.

An upper nozzle tubing of the misting array 320 has an upper liquid source coupling 322A on the exterior side of the sealing piece 330, extends through the sealing piece 330, and has an upper nozzle section 321A on an interior side of the sealing piece 330. The upper nozzle section 321A has a plurality of upwardly disposed nozzles 326A and downwardly disposed nozzles 328A coupled thereto. The upwardly and downwardly disposed nozzles 326A and 328A are alternatingly provided on the upper nozzle section 321A and are offset approximately forty degrees from one another. Similarly, a lower nozzle tubing of the misting array 320 has a lower liquid source coupling 322C on the exterior of the sealing piece 330, extends through the sealing piece 330, and has a lower nozzle section 321C on an interior side of the sealing piece 330. The lower nozzle section 321C has alternatingly provided upwardly and downwardly disposed nozzles 326A and 328A that are offset approximately forty degrees from one another.

Figure 17:
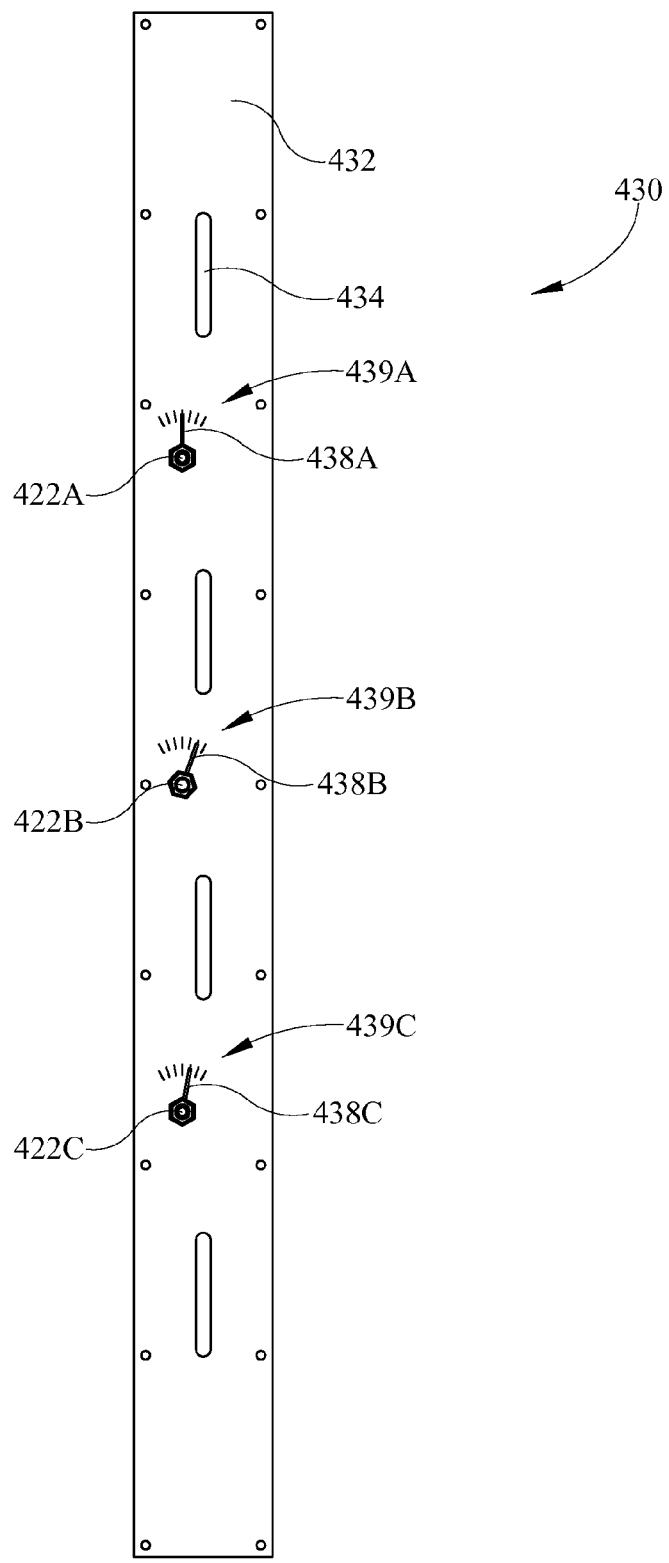
FIG. 17 illustrates a portion of a third embodiment of a misting array for use in an abatement system.
Figure 18A:
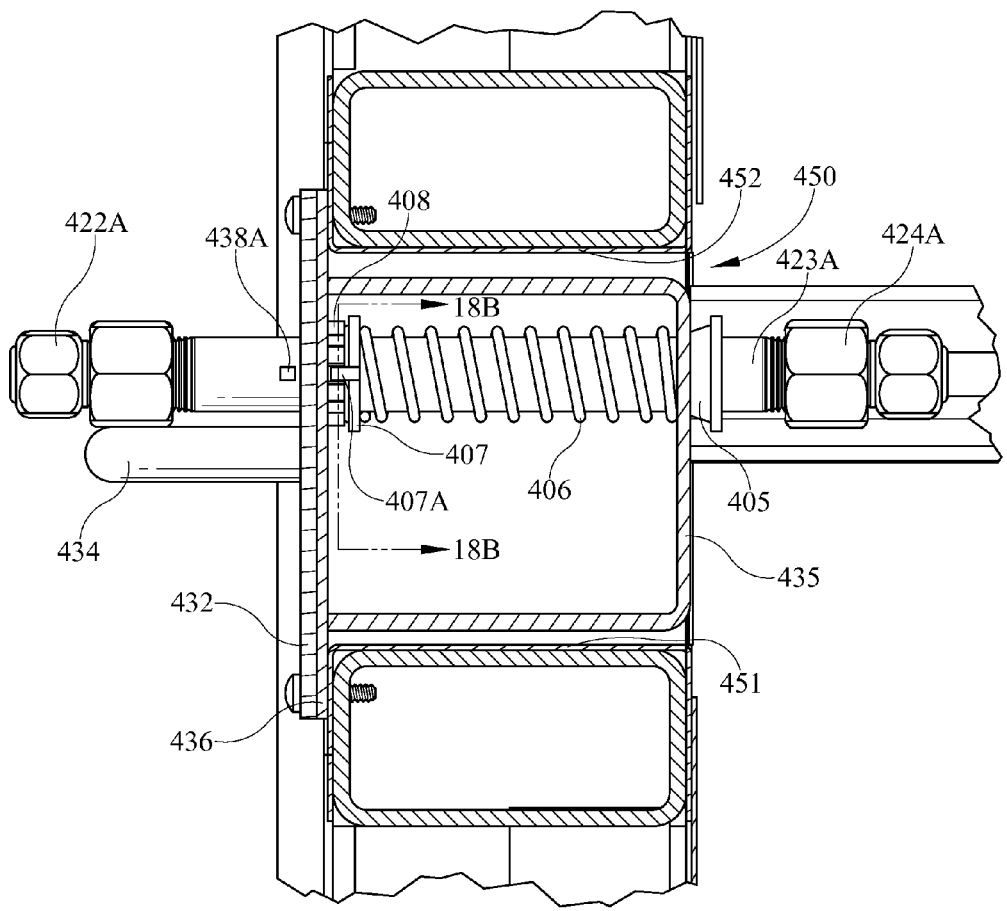
FIG. 18A illustrates a top section view of a portion of the third embodiment of the misting array of FIG. 17 shown inserted in a misting array opening.
Figure 18B:
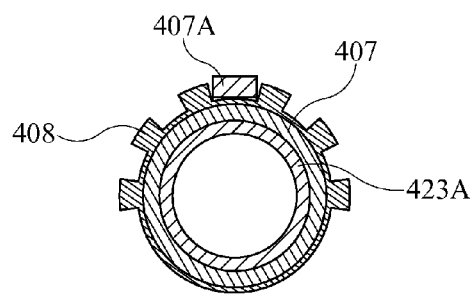
FIG. 18B illustrates a section view of a portion of the third embodiment of the misting array of FIG. 17 taken along the section line 18B-18B of FIG. 18A.

Referring now to FIG. 17, FIG. 18A, and FIG. 18B, aspects of a third embodiment of a misting array 420 for use in an abatement system are depicted and described. FIG. 17 depicts portions of the sealing piece 430 of the misting array 420. The sealing piece 430 includes a sealing plate 432 having vertically aligned handles 434 thereon. Liquid source couplings 422A, 422B, and 422C of upper, middle, and lower nozzle tubings, respectively, are provided on an exterior side of sealing plate 432. Indicators 438A, 438B, and 438C are coupled to pipe nipples 423A, 423B, and 423C of upper, middle, and lower nozzle tubing proximal respective of liquid source couplings 422A, 422B, and 422C. Fiducial markings 439A, 439B, and 439C are provided on the sealing plate 432 proximal respective of the indicators 438A, 438B, and 438C. The positioning of the indicators 438A, 438B, and 438C with respect to the fiducial markings 439A, 439B, and 439C is indicative of the rotational orientation of respective nozzle tubing coupled to the indicators 438A, 438B, and 438C. For example, the positioning of the indicator 438A may be indicative that the upper nozzle tubing coupled to the indicator 438A is at a first rotational orientation. The positioning of the indicator 438B may be indicative that the middle nozzle tubing coupled to the indicator 438B is at a second rotational orientation offset approximately twenty-five degrees from the first rotational orientation of the upper nozzle tubing.

In the depicted embodiment, the rotational orientation of respective nozzle tubing coupled to the indicators 438A, 438B, and 438C may be adjusted from exteriorly of the sealing piece 430. Referring to FIG. 18A, a top section view of a portion of the misting array 420 is shown with the misting array 420 inserted into an opening 450 of an abatement system. The opening 450 includes opposed sidewalls 451 and 452 and provides access to an abatement chamber. Portions of the upper nozzle tubing of the misting array 420 are visible in FIG. 18A. The upper nozzle tubing includes a pipe nipple 423A coupled to the liquid source coupling 422A. The pipe nipple 423A extends through the sealing plate 432 and the sealing piece extension 435 of the sealing piece 430. A gasket 405 is provided around pipe nipple 423A and sealingly engages an opening of sealing piece extension 435 through which pipe nipple 423A extends. A portion of the pipe nipple 423A between the sealing piece extension 435 and a female tube fitting 424A of the upper nozzle tubing is sized so as to engage the gasket 405 and thereby cause the gasket 405 to sealingly engage the opening of sealing piece extension 435.

An open coil spring 406 is interposed between an engagement washer 407 and an interior side of an abatement chamber facing wall of the sealing piece extension 435. The open coil spring 406 exerts force on the engagement washer 407 and the interior side of the abatement chamber facing wall of the sealing piece extension 435. The engagement washer 407 is provided around and fixedly coupled to the pipe nipple 423A. The engagement washer 407 includes an engagement protrusion 407A extending therefrom that releasably engages a keyed rotational restraint mechanism 408 that is coupled to an interior wall of the sealing plate 432. A section view of the engagement washer 407, rotational restraint mechanism 408, and pipe nipple 423A along the section line 18B-18B of FIG. 18A is shown in FIG. 18B. The rotational restraint mechanism 408 includes a plurality of notches radially arranged thereon that are sized to receive and substantially lock into place engagement protrusion 407A. Accordingly, engagement protrusion 407A may be locked into a desired of a plurality of preselected positions defined by the notches of restraint mechanism 408. When engagement protrusion 407A is locked into a notch of the restraint mechanism 408, the rotational orientation of the washer 407, the pipe nipple 423A, and the remainder of the nozzle tubing (including attached nozzles) is also locked into place.

In order to adjust the notch of restraint mechanism 408 in which engagement protrusion 407A is locked, a user may first cause force to be applied on pipe nipple 423A from exteriorly of the sealing plate 432 in a direction along the central axis of pipe nipple 423A. The force needs to be of a magnitude sufficient to compress spring 406 enough to cause the protrusion 407A to be disengaged from the restraint mechanism 408. The upper nozzle tubing may be coupled to a frame of misting array assembly 420 in such a manner as to allow sufficient translation thereof to enable the protrusion 407A to be disengaged from the restraint mechanism 408. Once force in a direction along the central axis of pipe nipple 423A is applied, the user may continue to apply such force and cause pipe nipple 423A (and the remainder of the upper nozzle tubing) to be rotated in a desired direction from exteriorly of the sealing plate 432. When the upper nozzle tubing is rotated to a desired orientation, the force in a direction along the central axis of pipe nipple 423A may be released to cause the protrusion 407A to engage a notch of the restraint mechanism 408. The force of the spring 406 will lock the protrusion 407A in place and will also cause a portion of the pipe nipple 423A to reengage the gasket 405 and thereby ensure the gasket 405 sealingly engages the opening through sealing plate extension 435. Slight tuning of the rotational orientation of the upper nozzle tubing may be necessary to cause the protrusion 407A to engage a notch of the restraint mechanism 408 (and not adjacent structure). In some embodiments the structure bordering the notches of restraint mechanism 408 and/or the protrusion 407A may be chamfered to help member protrusion 407A into a proximal adjacent notch. In some embodiments the fiducial markings 439A may be substantially aligned with notches of restraint mechanism 408 to aid in the rotational alignment of the upper nozzle tubing. Middle nozzle tubing and lower nozzle tubing of misting array 420 may optionally employ similar push and turn rotational adjustment structure described with respect to upper nozzle tubing of misting array 420. In some embodiments gasket 405 may be replaced or supplemented with other sealing structure. For example, in some embodiments dual bellows type carbon seals may be utilized. For example, a first bellows type carbon seal may be provided around and coupled to the pipe nipple 423A on an abatement chamber side of sealing piece extension 435 adjacent to sealing piece extension 435. A second bellows type carbon seal may be provided coupled to sealing piece extension 435 around the opening provided through the sealing piece extension 435. The first and second bellows type carbon seals maybe in sealing engagement when the protrusion 407A is engaging a notch of the restraint mechanism 408 and may be separated from one another when the spring 406 is sufficiently compressed.

Figure 19:
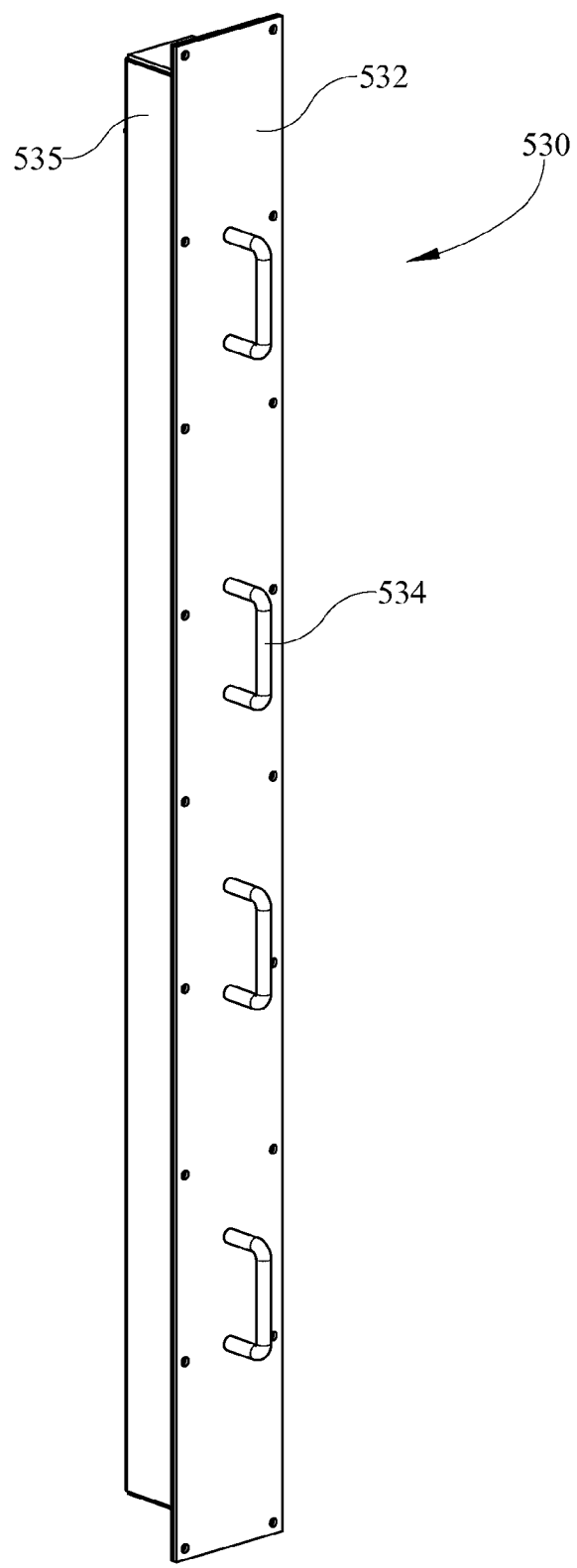
FIG. 19 illustrates a perspective view of a temporary replacement piece.

Referring now to FIG. 19, a perspective view of a temporary replacement piece 530 for use in an abatement system is shown. The temporary replacement piece 530 may be utilized in the first abatement system 100 and may block either of first misting array opening 150 or second misting array opening 250 when respective of first misting array 120 or second misting array 220 is removed therefrom. The temporary replacement piece is structurally similar to sealing pieces 130 and 230 and includes a sealing plate 532, a sealing plate extension 535, and a plurality of handles 534 vertically arranged on an exterior face of the sealing plate 532.

The temporary replacement piece 530 may be utilized when servicing and/or replacing one of the misting arrays 120 and 220. One of the misting arrays 120 or 220 may be removed from the abatement chamber of the abatement system 100, thereby exposing a respective of the misting array openings 150 or 250. One of the misting array openings 150 or 250 may then be covered with the temporary replacement piece 530. The temporary replacement piece 530 will seal the respective array opening 150 or 250. Fasteners may optionally be inserted in fastener apertures through the sealing plate 532 and received in corresponding apertures of the abatement system 100 to securely couple the sealing piece 530 over the misting array opening 150 or 250. While the temporary replacement piece 530 is in place and one of the misting arrays 120 or 220 removed, the abatement system 100 may continue to be operated with only one of the misting arrays 120 or 220 being in operation. Optionally, the amount of fluid input to the remaining of misting arrays 120 or 220 may be increased during such time period. The removed of misting arrays 120 or 220 may optionally be cleaned, repaired, and/or replaced with another misting array. When the cleaned, repaired, or replacement misting array is ready to be reinserted into the abatement chamber the temporary replacement piece 530 may be removed from the opening 150 or 250 to enable reinsertion. Optionally, the abatement chamber 100 may continue to operate during the entire time that one of the misting array openings 150 or 250 is removed or only during portions of such time (e.g., during the time that one of the misting array openings 150 or 250 is removed and temporary replacement piece 530 is in place over a respective of openings 150 or 250).

Figure 23:
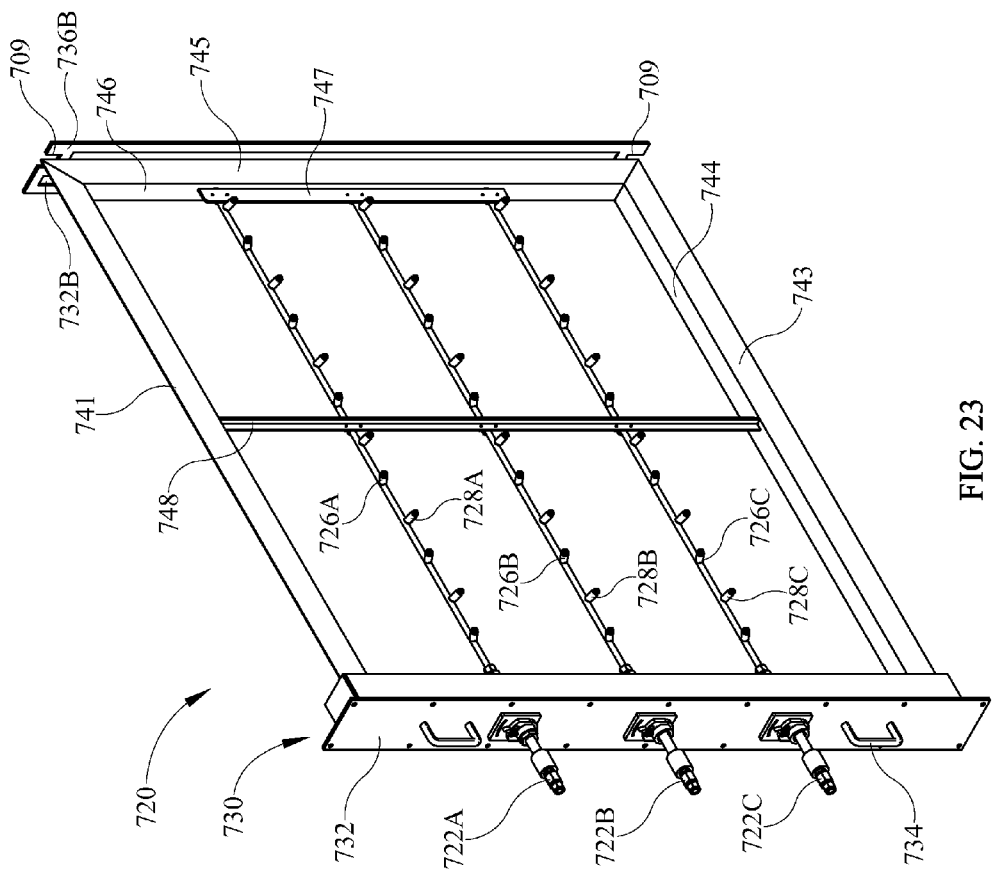
FIG. 23 illustrates a perspective view of a fourth embodiment of a misting array for use in an abatement system.

Referring now to FIG. 23, a fourth embodiment of a misting array 720 for use in an abatement system is depicted and described. The misting array 720 includes a sealing piece 730 having a sealing plate 732 and a sealing plate extension 735. Two handles 734 are provided on an exterior face of the sealing plate 732. A frame structure is coupled to and extends from the sealing piece 730 and includes an upper frame structure member 741 having an upper frame structure rim portion (not shown), a side frame structure member 745 having a side frame structure rim portion 746, and a lower frame structure member 743 having a lower frame structure rim portion 744. The frame structure also includes a middle support bar 748 and a side support bar 747.

An upper nozzle tubing of the misting array 720 has an upper liquid source coupling 722A on the exterior side of the sealing piece 730, extends through the sealing piece 730, and has a plurality of upwardly disposed nozzles 726A and downwardly disposed nozzles 728A coupled thereto. Similarly, a middle nozzle tubing has a middle liquid source coupling 722B on the exterior side of the sealing piece 730, extends through the sealing piece 730, and has a plurality of upwardly disposed nozzles 726B and downwardly disposed nozzles 728B coupled thereto. Similarly, a lower nozzle tubing of the misting array 720 has a lower liquid source coupling 722C on the exterior of the sealing piece 730, extends through the sealing piece 730, and has a plurality of upwardly disposed nozzles 726C and downwardly disposed nozzles 728C coupled thereto.

A temporary replacement piece 732B is coupled to the side frame structure member 745 of the frame structure of the misting array 720. The temporary replacement piece 732B is substantially similar to sealing plate 732 and includes a gasket 736B on an engagement surface thereof. The temporary replacement piece 732B may be coupled to the frame structure member 745 after portions of the misting array 720 have been inserted into an opening of an abatement chamber. When the misting array 720 is fully inserted in the abatement chamber the temporary replacement piece 732B may be proximal a wall of the abatement chamber that is opposite the opening through the abatement chamber. When the misting array 720 is removed from the abatement chamber the temporary replacement piece 732B will sealingly engage the opening through the abatement chamber from inside the abatement chamber. The misting array 720 may be repaired or replaced while the misting array 720 is removed and the temporary replacement piece 732B is covering the opening through the abatement chamber. The temporary replacement piece 732B may optionally include one or more apertures that receive fasteners inserted through apertures through the abatement system 100. The temporary replacement piece 732B may also optionally include one or more notches 709 at the top short end thereof and/or the bottom short end thereof. The one or more notches 709 may be sized to interface with track structure within the abatement chamber to thereby enable the temporary replacement piece 732B to move without substantial interference from the track structure.

Figure 20:
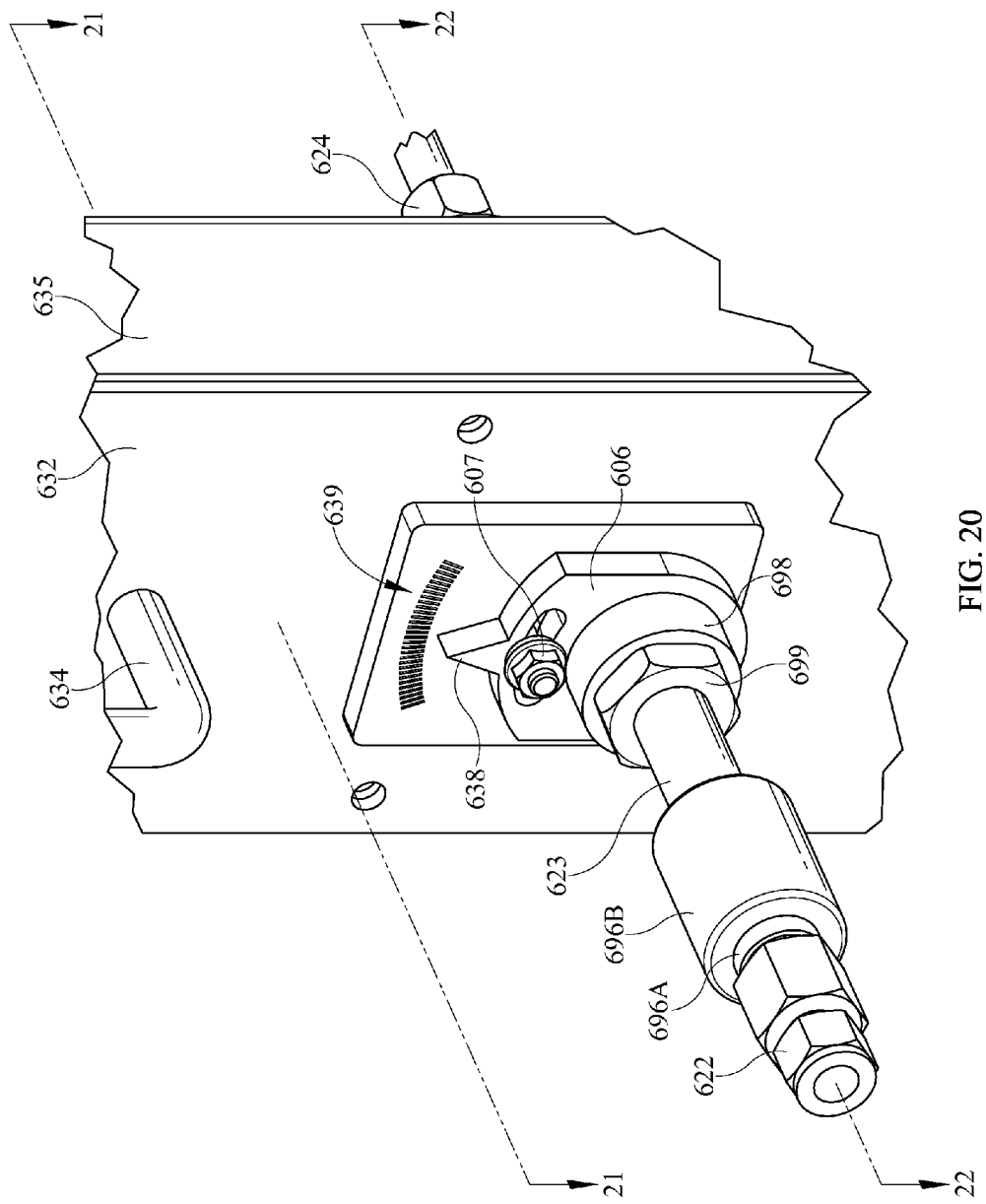
FIG. 20 illustrates a perspective view of a portion of a fifth embodiment of a misting array for use in an abatement system.
Figure 21:
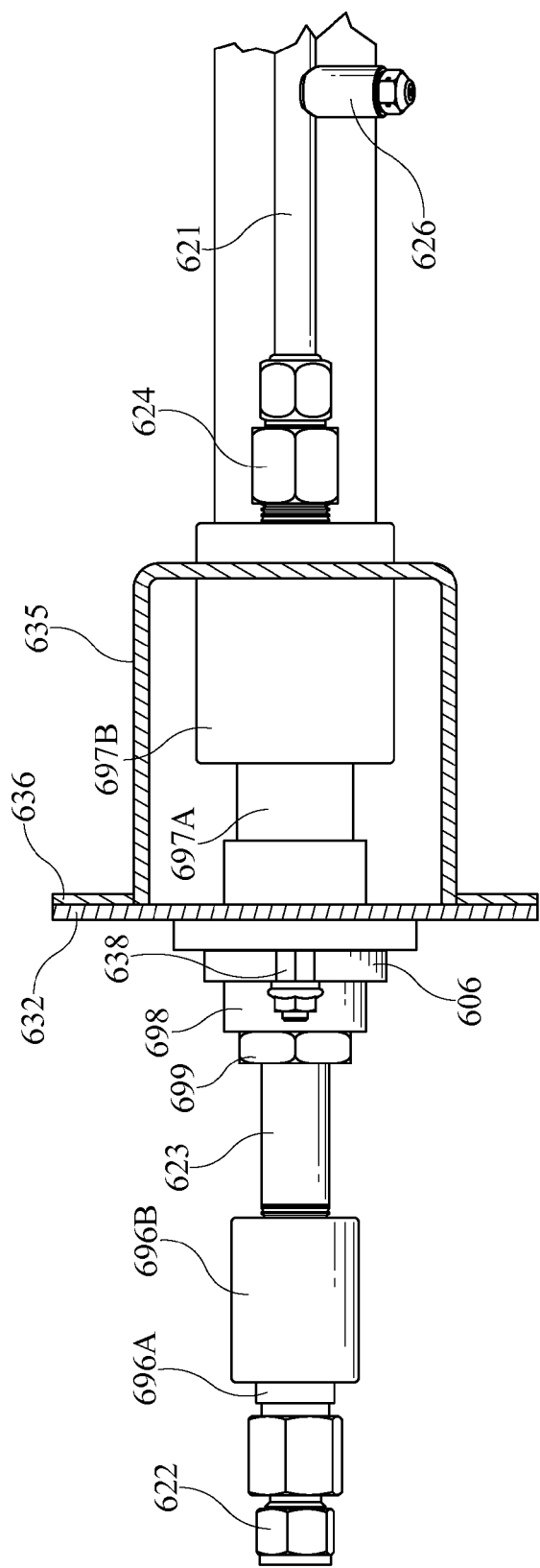
FIG. 21 illustrates a top section view of the fifth embodiment of the misting array of FIG. 20 taken along the section line 21-21 of FIG. 20.
Figure 22:
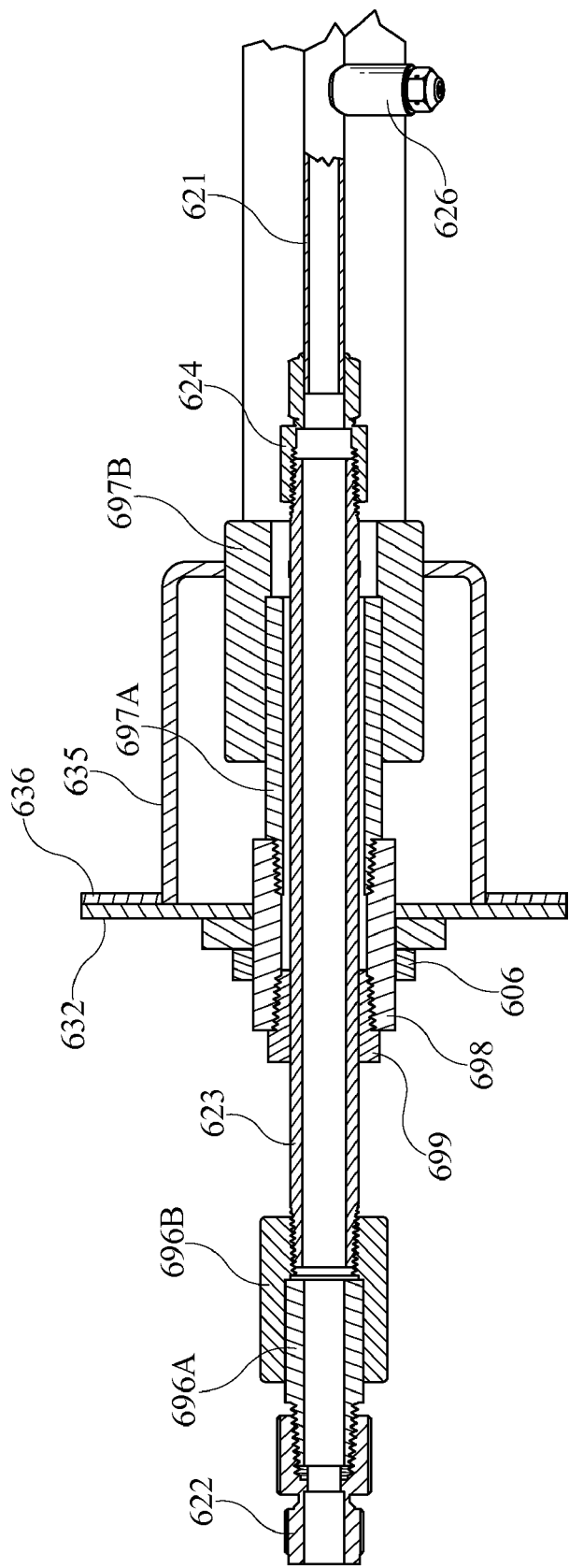
FIG. 22 illustrates a top section view of the fifth embodiment of the misting array of FIG. 20 taken along the section line 22-22 of FIG. 20.

Referring now to FIG. 20 through FIG. 22, aspects of a fifth embodiment of a misting array for use in an abatement system are depicted and described. Portions of a sealing piece 630 of the misting array are illustrated and include a sealing plate 632 having a handle 634 thereon. A sealing piece extension 635 extends rearwardly from the sealing plate 632. Portions of a nozzle tubing of the misting array are also illustrated. The nozzle tubing includes a first inline swivel coupled to the liquid source coupling 622. The first inline swivel includes a first portion 696A and a second portion 696B that are rotationally adjustable and sealed with respect to one another. The first portion 696A includes a male connection threadedly and sealingly coupled to the liquid source coupling 622. The second portion 696B includes a female connection threadedly and sealingly coupled to a pipe nipple 623. The pipe nipple 623 extends through a journal 698 that is extending through an opening in the sealing plate 632. The pipe nipple 623 is sealingly coupled to the journal 698 via a compression nut 699 threadedly received by the journal 698. The journal 698 is sealingly coupled to a first portion 697A of a second inline swivel that is rotationally adjustable with respect to a second portion 697B of the second inline swivel. The second portion 697B of the second inline swivel extends through an opening in the sealing piece extension 635 and is seal welded to the opening through sealing piece extension 635. The pipe nipple 623 extends through the second inline swivel and is coupled to a female tube fitting 624 which, in turn, is coupled to a nozzle section 621. An upwardly disposed nozzle 626 is visible in FIG. 22 extending from the nozzle section 621.

The journal 698 is selectively rotatable within the opening through the sealing plate 632. The journal 698 is coupled to an adjustment plate 606 having an aperture therethrough. The aperture through the adjustment plate 606 has a screw extending therethrough. The screw is coupled to the sealing plate 632 and removably receives an adjustment lock down nut 607. When the adjustment lock down nut 607 is sufficiently tightened, thereby compressing adjustment plate 606, the journal 698 is restrained from rotating within the opening through the sealing plate 632. However, when the adjustment lock down nut 607 is loosened, the journal 698 may rotate freely within the opening through the sealing plate 632. Accordingly, loosening the lock down nut 607 allows the second portion 696B of the first inline swivel, the pipe nipple 623, the compression nut 699, the journal 698, the first portion 697A of the second inline swivel, the female tube fitting 624, and the nozzle section 624 to all rotate in unison. The aforementioned elements will all be rotated in unison since they are all coupled to one another. Moreover, the coupling between the aforementioned elements, along with the seal welding between the second portion 697B of the second inline swivel and the sealing piece extension 635, ensures a seal may be maintained between an abatement chamber and an external environment. The embodiment of FIG. 20 through FIG. 22 enables rotation of the nozzle tubing from exteriorly of an abatement system while maintaining a seal between an abatement chamber and the external environment.

An indicator 638 extends from adjustment plate 606 and is proximal fiducial markings 639 provided on a plate interposed between adjustment plate 606 and sealing plate 632. The positioning of the indicator 638 with respect to the fiducial markings 639 is indicative of the rotational orientation of the nozzle tubing. In some embodiments the inline swivels may be Series 006 Inline Swivels with Bushings available from Rotary Systems, Inc. (Minneapolis, Minn.).

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An abatement system, said abatement system comprising:
   a gas flow inlet;
   an abatement chamber downstream of said gas flow inlet, said abatement chamber having an abatement chamber misting section having an opening therethrough, said opening extending between said abatement chamber misting section and a shell of said abatement system;
   an abatement chamber gas flow outlet downstream of said abatement chamber misting section;
      wherein said abatement chamber has a gas flow extending from said gas flow inlet to said gas flow outlet;
   a misting array assembly received in said abatement chamber misting section, said misting array assembly comprising a sealing piece blocking said opening, a frame structure coupled to said sealing piece and extending into said abatement chamber misting section, a nozzle tubing coupled to said frame structure, and at least one nozzle coupled to said nozzle tubing; said nozzle tubing extending into said abatement chamber;

wherein at least a portion of said nozzle tubing is fixedly rotationally adjustable from exteriorly of said abatement system to a plurality of positions, whereby adjusting said nozzle tubing correspondingly adjusts said at least one nozzle.

2. The abatement system of claim 1 wherein said nozzle tubing is rotationally adjustable to a plurality of fixed preselected positions.

3. The abatement system of claim 1 wherein said nozzle tubing is linearly extending.

4. The abatement system of claim 1 wherein said nozzle tubing is rotationally adjustable between at least a first position and a second position that are rotationally offset at least ten degrees from one another.

5. The abatement system of claim 1 wherein a plurality of said nozzle are coupled to said nozzle tubing.

6. The abatement system of claim 5 wherein some of said plurality of said nozzle are upwardly extending and some of said nozzle are downwardly extending.

7. The abatement system of claim 1 wherein said sealing piece includes a sealing plate.

8. The abatement system of claim 7 wherein said sealing piece further includes a sealing piece extension extending from said sealing plate into said opening.

9. The abatement system of claim 1 wherein said nozzle tubing extends through said sealing piece.

10. A misting array assembly disposed across an abatement chamber of an abatement system, said abatement chamber having a gas flow extending therethrough, a majority of said gas flow moving in a gas flow direction, said misting array assembly comprising:

a sealing piece having a first side and a second side opposite said first side;

a frame structure coupled to said sealing piece and provided on said second side of said sealing piece;

wherein at least a portion of the outer periphery of said frame structure engages structure within said abatement chamber;

a first nozzle tubing coupled to said frame structure and extending through said sealing piece, said first nozzle tubing having a liquid source coupling on said first side of said sealing piece and a nozzle section on said second side of said sealing piece;

a plurality of first tubing nozzles, said first tubing nozzles coupled to said first nozzle tubing;

a second nozzle tubing coupled to said frame structure and extending through said sealing piece, said second nozzle tubing having a second liquid source coupling on said first side of said sealing piece and a second nozzle section on said second side of said sealing piece;

a plurality of second tubing nozzles, said second tubing nozzles coupled to said second nozzle tubing;

wherein said first nozzle section is independently fixedly rotationally adjustable to a plurality of first nozzle section positions, whereby adjusting said first nozzle section correspondingly adjusts said first tubing nozzles; and wherein said second nozzle section is independently fixedly rotationally adjustable to a plurality of second nozzle section positions, whereby adjusting said second nozzle section correspondingly adjusts said second tubing nozzles.

11. The misting array assembly of claim 10 wherein a plurality of said first tubing nozzles are upwardly disposed first tubing nozzles and a plurality of said first tubing nozzles are downwardly disposed first tubing nozzles.

12. The misting array assembly of claim 11 wherein said first nozzle section is linearly extending.

13. The misting array assembly of claim 10 wherein said first nozzle section and second nozzle section are each independently rotationally adjustable to a plurality of fixed preselected positions.

14. The misting array assembly of claim 10 wherein said first nozzle tubing and said second nozzle tubing are fixedly rotationally adjustable from a location on said first side of said sealing piece.

15. The misting array assembly of claim 11 wherein said first nozzle tubing includes an indicator on said first side of said sealing piece.

16. The misting array assembly of claim 10 wherein said first side of said sealing piece includes a plurality of fiducial markings proximal said indicator.

17. The misting array assembly of claim 16 wherein an upward nozzle output central axis of each of said upwardly disposed first tubing nozzles is at a ten to thirty degree upward angle with respect to the direction of said gas flow and a downward nozzle output central axis of each of said downwardly disposed first tubing nozzles is at a ten to thirty degree downward angle with respect to the direction of said gas flow.

18. A misting array assembly disposed across an abatement chamber of an abatement system, said abatement chamber having a gas flow extending therethrough, a majority of said gas flow moving in a gas flow direction, said misting array assembly comprising:

a sealing piece having a first side and a second side opposite said first side;

a frame structure coupled to said sealing piece and provided on said second side of said sealing piece;

a first nozzle tubing coupled to said frame structure and extending through said sealing piece, said first nozzle tubing having a first nozzle tubing axis extending substantially perpendicular to the direction of said gas flow, said first nozzle tubing having a liquid source coupling and a plurality of first tubing nozzles;

wherein said first liquid source coupling is on said first side of said sealing piece and said first tubing nozzles are on said second side of said sealing piece;

a second nozzle tubing coupled to said frame structure and extending through said sealing piece, said second nozzle tubing having a second nozzle tubing axis extending substantially perpendicular to the direction of said gas flow, said second nozzle tubing having a liquid source coupling and a plurality of second tubing nozzles;

wherein said second liquid source coupling is on said first side of said sealing piece and said second tubing nozzles are on said second side of said sealing piece;

wherein at least a portion of said first nozzle tubing and a portion of said second nozzle tubing are each independently fixedly rotationally adjustable to a plurality of positions.

19. The misting array assembly of claim 18 wherein said second nozzle tubing is positioned with respect to said first nozzle tubing in a direction that is substantially perpendicular to the direction of said gas flow.

20. The misting array assembly of claim 18 wherein said first nozzle tubing includes a pipe nipple extending through said sealing piece.

21. The misting array assembly of claim 18 wherein said first nozzle tubing includes an adjustable coupling on an interior side of said sealing plate.

* * * * *